(12) United States Patent
Shigekusa et al.

(10) Patent No.: US 6,678,412 B1
(45) Date of Patent: Jan. 13, 2004

(54) METHOD FOR DETECTING A TWO-DIMENSIONAL CODE EXISTING AREA, METHOD READING TWO-DIMENSIONAL CODE, AND A RECORDING MEDIUM STORING RELATED PROGRAMS

(75) Inventors: Hisashi Shigekusa, Okazaki (JP); Masami Tanaka, Handa (JP); Tadao Nojiri, Oobu (JP); Masahiro Iida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/543,881

(22) Filed: Apr. 6, 2000

(30) Foreign Application Priority Data

Apr. 8, 1999 (JP) ............................................. 11-101381
Jun. 8, 1999 (JP) ............................................. 11-161065

(51) Int. Cl.$^7$ .................................................. G06K 9/00
(52) U.S. Cl. ........................ 382/181; 382/183; 382/306; 235/462.09
(58) Field of Search ............................... 382/137–139, 382/173, 181–183, 190, 192, 205, 209, 217–219, 274, 306, 312; 235/456, 462.04, 462.09, 462.2, 462.11, 494

(56) References Cited

U.S. PATENT DOCUMENTS

| | | | | |
|---|---|---|---|---|
| 5,304,787 A | * | 4/1994 | Wang | 235/462.09 |
| 5,319,181 A | * | 6/1994 | Shellhammer et al. | 235/462.09 |
| 5,378,881 A | * | 1/1995 | Adachi | 235/462.09 |
| 5,489,769 A | * | 2/1996 | Kubo | 235/462.09 |
| 5,691,527 A | * | 11/1997 | Hara et al. | 235/456 |
| 5,726,435 A | * | 3/1998 | Hara et al. | 235/494 |
| 5,764,798 A | | 6/1998 | Liu | 382/190 |
| 6,081,627 A | * | 6/2000 | Kannon et al. | 382/312 |

FOREIGN PATENT DOCUMENTS

JP 10-198754 7/1998

* cited by examiner

*Primary Examiner*—Daniel G. Mariam
(74) *Attorney, Agent, or Firm*—Harness, Dickey & Pierce PLC

(57) ABSTRACT

An image region of an image data memory is dissected into a plurality of search sections. Brightness change points in each of the search sections are counted based on image data of each search section. A candidate region having a likelihood of involving an information code is detected based on the count value of the brightness change points. And, the candidate region is identified as the existing area of the information code.

16 Claims, 16 Drawing Sheets

FIG. 5A
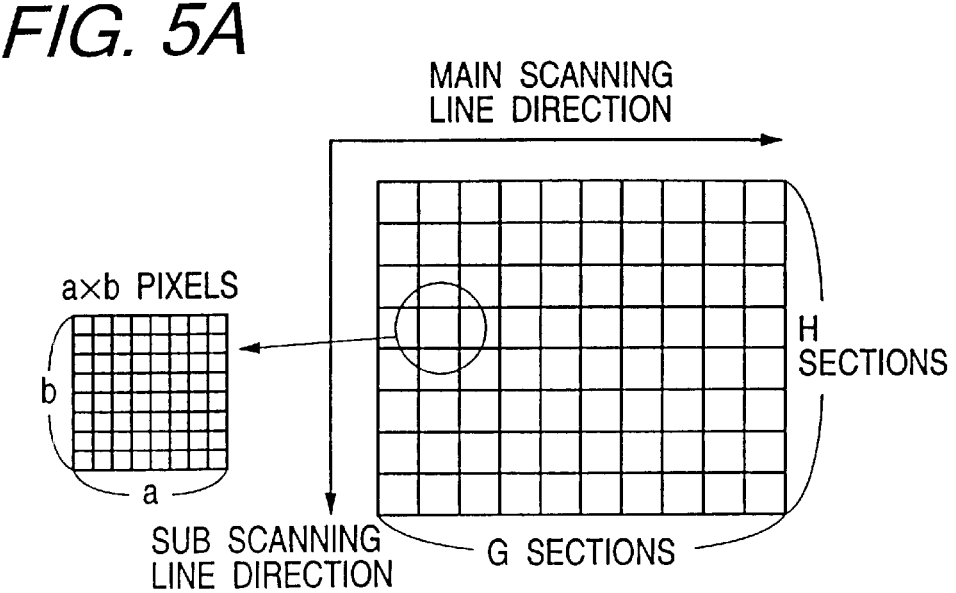
FIG. 5B
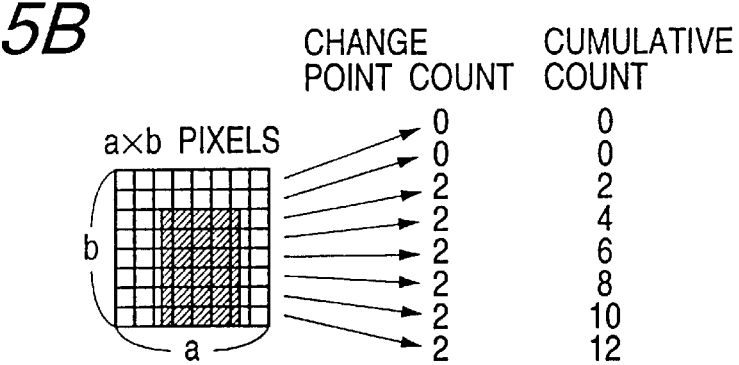
FIG. 5C
| 1 | 2 | 1 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 3 | 7 | 2 | 0 | 0 |
| 0 | 0 | 0 | 8 | 12 | 16 | 15 | 5 | 0 | 0 |
| 0 | 0 | 0 | 4 | 14 | 18 | 12 | 8 | 0 | 0 |
| 0 | 0 | 0 | 0 | 10 | 10 | 9 | 7 | 4 | 0 |
| 0 | 0 | 0 | 0 | 4 | 6 | 6 | 4 | 0 | 0 |
| 0 | 0 | 0 | 0 | 0 | 0 | 0 | 0 | 0 | 0 |

CHANGE POINT COUNT
TABLE FOR SMALL
SEARCH SECTIONS

CHANGE POINT COUNT
TABLE FOR LARGE
SEARCH SECTIONS

METHOD FOR DETECTING A TWO-DIMENSIONAL CODE EXISTING AREA, METHOD READING TWO-DIMENSIONAL CODE, AND A RECORDING MEDIUM STORING RELATED PROGRAMS

BACKGROUND OF THE INVENTION

The present invention relates to a method for detecting or estimating an existing area of a two-dimensional code on an image data memory, and also relates to a method for reading the information from the two-dimensional code identified by the above detecting or estimating method. The present invention further relates to a recording medium capable of storing a program of the code existing area detecting or estimating method as well as a program of the code reading method of the present invention, which is installable in a computer system or a comparable digital circuit.

The Unexamined Japanese Patent Publication No. 10-198754 discloses a conventional code reader which searches a two-dimensional code image by using representative scanning lines.

The U.S. Pat. No. 5,764,798 discloses prioritized searching methods for finding a coded symbol in digitized image by setting search lines of various directions.

SUMMARY OF THE INVENTION

An object of the present invention is to provide a method for efficiently and promptly estimating or detecting an existing area of a two-dimensional code or an information code.

Another object of the present invention is to reduce an overall processing time in the reading operation of a two-dimensional code or an information code.

Another object of the present invention is to store the methods of the present invention in a recording medium, as a program installable in a computer system or a comparable digital circuit.

The present invention provides a first method for estimating an existing area of an information code, comprising a step of inputting a two-dimensional image of an information code, a step of storing image data of a predetermined image region on an image data memory, the image data including the two-dimensional image of the information code, and a step of estimating an existing area of the information code in the image region of the image data memory based on the stored image data.

The first method further comprises a step of dissecting the image region into a plurality of search sections, a step of counting brightness change points in each of the search sections based on image data of each search section, a step of detecting a candidate region having a likelihood of involving the information code based on the count value of the brightness change points, and a step of identifying the candidate region as the existing area of the information code.

Preferably, in the first method, the plurality of search sections are rectangular sections dissected or segmented by lines parallel to a main scanning line used for scanning the image region in a horizontal direction and also by lines parallel to a sub scanning line used for scanning the image region in a vertical direction.

Preferably, in the first method, the information code consists of a plurality of cells arranged in a two-dimensional pattern, and each of the search sections is larger than a minimum size of the cell on the image data memory. For example, each of the search sections is larger than two times the minimum size of the cell on the image data memory.

Preferably, in the first method, the search sections are arranged so as to correspond to each main scanning line used in a horizontal scanning operation of the image region.

Preferably, in the first method, each of the search sections is further dissected or segmented into a plurality of smaller search sections.

Preferably, in the first method, the candidate region consists of consecutive search sections, and a higher priority is given to a candidate region positioned near the center of the image region when a plurality of candidate regions are detected. In addition to the above, it is preferable to give a higher priority to a candidate region having a large value in the total number of consecutive search sections involved therein.

Preferably, in the first method, the search sections are arranged in a hierarchical structure so that one upper-grade search section is dissected into a plurality of lower-grade search sections. In this case, the first method further comprises a step of comparing a count value of brightness change points in each upper-grade search section with a predetermined upper-grade threshold, a step of detecting a candidate region consisting of consecutive upper-grade search sections having a count value of brightness change points equal to or larger than the upper-grade threshold, a step of comparing a count value of brightness change points in each lower-grade search section with a predetermined lower-grade threshold when this lower-grade search section belongs to an upper-grade search section positioned in the vicinity of the candidate region, a step of adding the lower-grade search section to the candidate region when this lower-grade search section has a count value of brightness change points equal to or larger than the lower-grade threshold, and a step of identifying the candidate region including the added lower-grade search section as the existing area of the information code.

Preferably, in the first method, a counting operation of brightness change points is performed in parallel with a storing operation of the image data into the image data memory, and a count table is used to obtain the relationship between the counted data of the brightness change points and corresponding search sections, so that the existing area of the information code can be estimated based the data of the count table. For example, the counting operation of the brightness change points includes the steps of renewing a memory region in response to an input of image data so as to store both a brightest data and a darkest data among brightness-related data having been ever received, calculating a mid value equivalent to an average of the brightest data and the darkest data, comparing a newly entered data with the mid value to make a bright-dark judgement, and counting each change in the result of the bright-dark judgement as a brightness change point. Furthermore, a darkness upper limit and a brightness lower limit are used in the bright-dark judgement. The darkness upper limit is darker than the brightest data by a predetermined darkness margin. The brightness lower limit is brighter than the darkest data by a predetermined brightness margin. The bright-dark judgement results in "bright" when the newly entered data is not smaller than both of the mid value and the brightness lower limit, and results in "dark" when the newly entered data is smaller than the mid value and not larger than the darkness upper limit.

Preferably, the first method further comprises a step of scanning each search section by a plurality of scanning lines, a step of counting the brightness change points along each scanning line, a step of obtaining a cumulative count value by counting the number of the brightness change points cumulatively until the search section is completely scanned by the plurality of scanning lines, and a step of obtaining the total number of the brightness change points of each search section based on the cumulative count value.

Preferably, the first method further comprises the steps of obtaining an average of brightness-related values of the image data involved in the search section, and using the average of brightness-related values as one of judging conditions for detecting and identifying the candidate region.

The present invention provides a second method for reading an information code, comprising a step of inputting a two-dimensional image of an information code, a step of storing image data of a predetermined image region on an image data memory, the image data including the two-dimensional image of the information code, a step of dissecting the image region into a plurality of search sections, a step of counting brightness change points in each of the search sections based on image data of each search section, a step of detecting a candidate region having a likelihood of involving the information code based on the count value of the brightness change points, a step of identifying the candidate region as an existing area of the information code in the image region of the image data memory, a step of setting search lines only in a limited region corresponding to the candidate region, a step of detecting the existing area of the information code by searching the image data along the plurality of search lines, and a step of reading the contents of the information code involved in the detected existing area based on the image data of the detected existing area.

The present invention provides an information code reading apparatus, according to which an input means is provided for inputting a two-dimensional image of an information code. The image data memory is provided for storing image data of a predetermined image region entered from the input means. The image data includes the two-dimensional image of the information code. An existing area detecting means is provided for estimating an existing area of the information code in the image region of the image data memory based on the stored image data, by dissecting the image region into a plurality of search sections, counting brightness change points in each of the search sections based on image data of each search section, detecting a candidate region having a likelihood of involving the information code based on the count value of the brightness change points, and identifying the candidate region as the existing area of the information code. And, a reading means is provided for reading the information code involved in the detected existing area based on the image data of the detected existing area.

Furthermore, the present invention provides a first storing medium for storing a program installable in a computer system for detecting the existing area of an information code on an image data memory in accordance with the above first method.

Furthermore, the present invention provides a second storing medium for storing a program installable in a computer system for reading an information code on an image data memory in accordance with the above second method.

BRIEF DESCRIPTION OF THE DRAWINGS

The above and other objects, features and advantages of the present invention will become more apparent from the following detailed description which is to be read in conjunction with the accompanying drawings, in which:

FIG. 5A is a view showing dissected search sections in accordance with the first embodiment of the present invention;

FIG. 5B is a view explaining a change point counting operation in accordance with the first embodiment of the present invention;

FIG. 5C is a view showing a brightness change point count table obtained in accordance with the first embodiment of the present invention;

DESCRIPTION OF THE PREFERRED EMBODIMENTS

Figure 1:
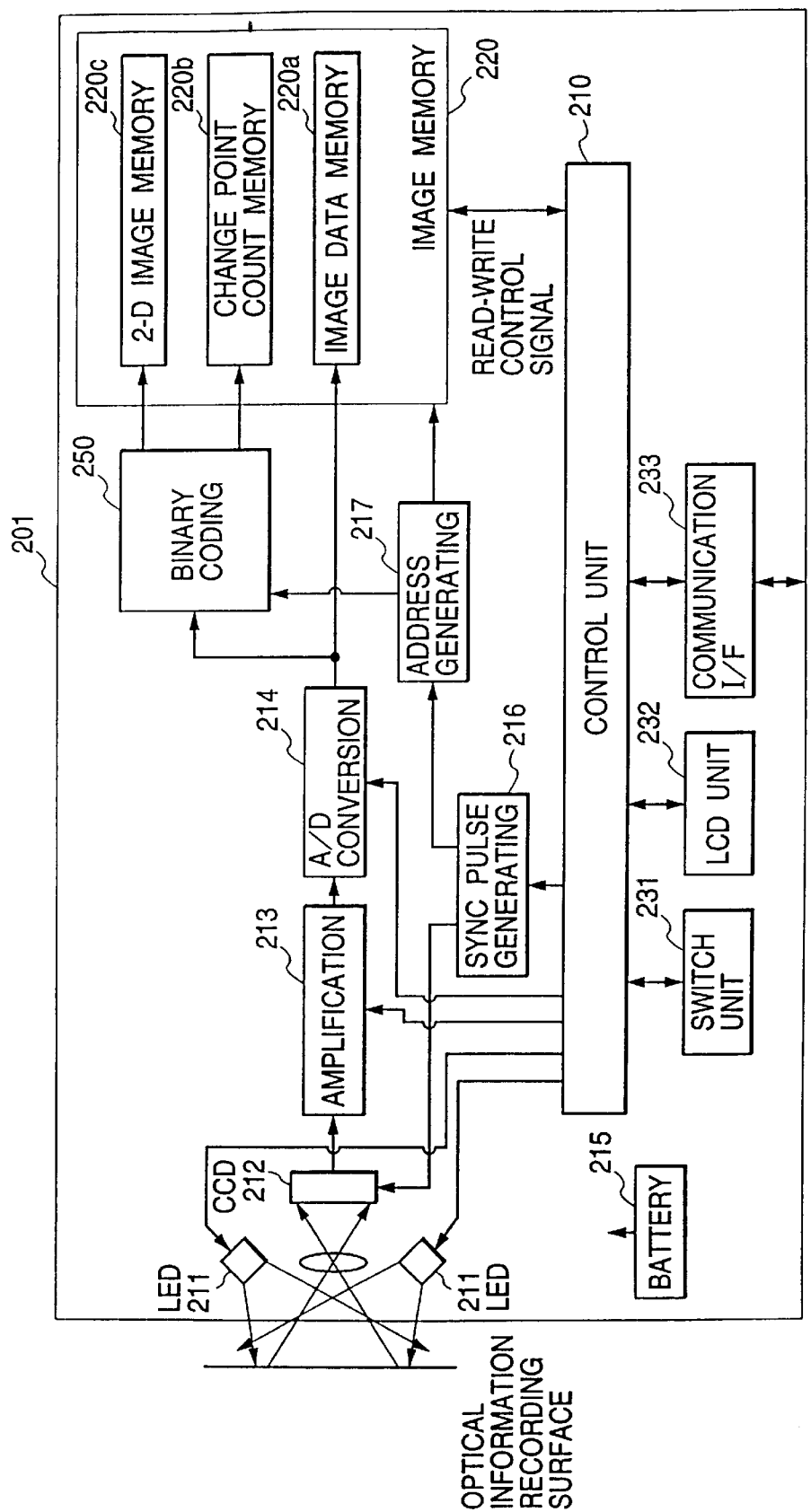
FIG. 1 is a block diagram showing the schematic arrangement of an information code reading apparatus in accordance with a first embodiment of the present invention.

Preferred embodiments of the present invention will be explained hereinafter with reference to attached drawings. Identical parts are denoted by the same reference numerals throughout the views.

First Embodiment

FIG. 1 is a block diagram showing the schematic arrangement of an information code reading apparatus 201 in accordance with a first embodiment of the present invention.

The information code reading apparatus 201 comprises a control unit 210, a pair of LEDs (i.e., light-emitting diodes) 211, a CCD (i.e., charge-coupled device) areal sensor 212, an amplification circuit 213, an AND (i.e., analog/digital) conversion circuit 214, a sync pulse generating circuit 216, an address generating circuit 217, an image memory 220, a switch unit (consisting of a plurality of switches) 231, an LCD (i.e., liquid crystal display) unit 232, a communication I/F (i.e., interface) circuit 233, and a binary coding circuit 250. The control unit 210 is constituted by a computer system chiefly comprising CPU, ROM, RAM, I/O etc. In this control unit 210, the CPU executes the later-described information code reading processing in accordance with a program stored in the ROM. The control unit 210 controls various components in the information code reading apparatus 201. Each of LEDs 211 emits red light to irradiate a two-dimensional code to be read.

The CCD areal sensor 212 comprises a plurality of CCDs (serving as light-receiving elements) arrayed in a predetermined two-dimensional matrix pattern to pick up the image scene in front of it. The picked-up image (i.e., two-dimensional image) is converted into horizontal scanning line signals which are sent to the amplification circuit 213.

The amplification circuit 213 amplifies the scanning line signal generated from the CCD areal sensor 212 at an amplification rate corresponding to a gain control voltage supplied from the control unit 210.

The A/D conversion circuit 214 receives an amplified analog scanning line signal produced from the amplification circuit 213, and converts this analog scanning line signal into a digital signal. The image memory 220 receives the digital signal produced from the A/D conversion circuit 214.

The CCD areal sensor 212 repeats the image pickup operation. The image data stored in the image memory 220 is renewed in synchronism with each repetition of the image-pickup operation.

The sync pulse generating circuit 216 generates sync pulses, each having a pulse width sufficiently narrower than the pulse width of the two-dimensional image data generated from the CCD areal sensor 212. The address generating circuit 217 counts the sync pulses generated from the sync pulse generating circuit 216 and converts the count value into an address on the image memory 220.

The image memory 220 comprises an image data memory 220a, a change point count memory 220b, and a two-dimensional image memory 220c. The digital image data produced from the A/D conversion circuit 214 is stored in the image data memory 220a of the image memory 220.

The digital image data produced from the A/D conversion circuit 214 is also sent to the binary coding circuit 250.

The switch unit 231 consists of a plurality of switches, such as a read switch, ten keys, various function keys, which are used by an operator to enter instructions, information and data. For example, the operator depresses or manipulates the read switch to commence the information code reading operation.

The LCD unit 232 is provided to display the image of a two-dimensional code which is image-picked up by this code reading apparatus 201.

The communication I/F circuit 233 performs wireless communications with an external device, such as a host computer or the like. For example, the communication I/F circuit 233 transmits the communication data to the external device via a light emitting element (not shown), or receives the communication data from it via a light receiving element (not shown). The data (or information) received from the external device includes system's operation programs as well as commands relating to the data transmission of the decoded information code. It is needless to say that the data communication between the information code reading apparatus 201 (i.e., communication I/F circuit 233) and the external device can be performed by cable.

A battery 215 supplies electric power to the components in the information code reading apparatus 201.

Detailed arrangement of the binary coding circuit 250 will be explained with reference to the functional block diagrams of FIGS. 2 and 3.

The binary coding circuit 250 comprises a brightness comparator 251, a darkness comparator 252, a bright-dark judging unit 253, a counter 254, a margin memory block 255, and a block address control circuit 256. The digital image data produced from the A/D conversion circuit 214 is supplied to each of the brightness comparator 251, the darkness comparator 252, and the bright-dark judging unit 253. The bright-dark judging unit 253 receives output data produced from the brightness comparator 251 and the darkness comparator 252. The output data of the bright-dark judging unit 253 is sent to the counter 254 and also to the two-dimensional image memory 220c of the image memory 220. The output (i.e., count value) of the counter 254 is sent to the change point count memory 220b of the image memory 220.

The control unit 210 sends a read/write control signal to the brightness comparator 251, the darkness comparator 252, the bright-dark judging unit 253, the margin memory block 255, and the block address control circuit 256.

The block address control circuit 256 receives an address control signal sent from the address generating circuit 217. The change point count memory 220b of the image memory 220 receives a control signal sent from the block address control circuit 256. Each of the image data memory 220a and the two-dimensional image memory 220c receives the address control signal sent from the address generating circuit 217.

Figure 3:
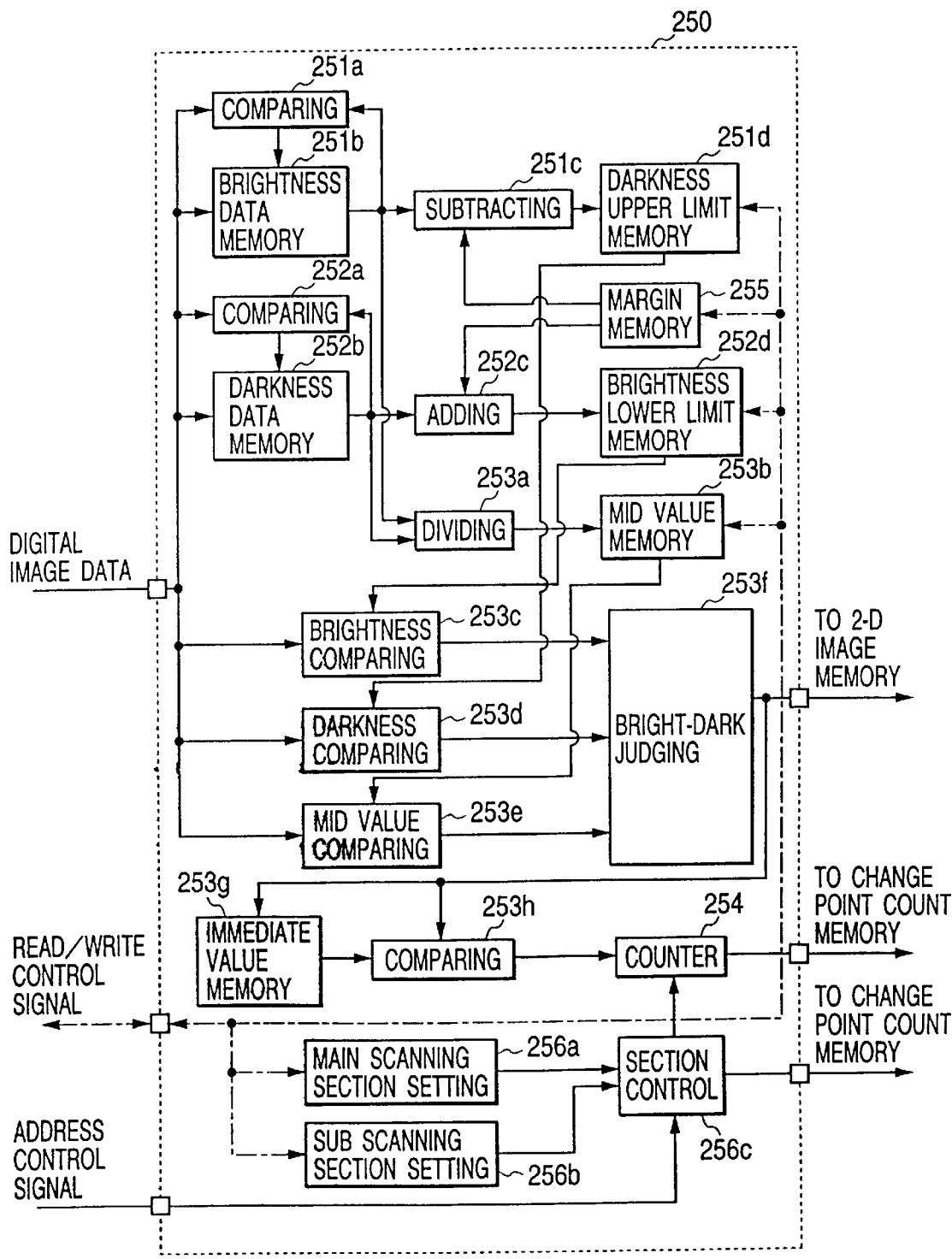
FIG. 3 is a detailed block diagram showing the schematic arrangement of the binary coding circuit of the information code reading apparatus in accordance with the first embodiment of the present invention.

More specifically, as shown in FIG. 3, the brightness comparator 251 consists of a comparing block 251a, a brightness data memory block 251b, a subtracting block 251c, and a darkness upper limit memory block 251d. The darkness comparator 252 consists of a comparing block 252a, a darkness data memory block 252b, an adding block 252c, and a brightness lower limit memory block 252d. The bright-dark judging unit 253 consists of a dividing block 253a, a mid value memory block 253b, a brightness comparing block 253c, a darkness comparing block 253d, a mid value comparing block 253e, a bright-dark judging block 253f, an immediate value memory circuit 253g, and a comparing block 253h.

The bright-dark judging block 253f receives respective output signals produced from the brightness comparing block 253c, the darkness comparing block 253d and the mid value comparing block 253e, and then performs a bright-dark judgement based on the received signals according to predetermined judging conditions.

The block address control circuit 256 consists of a main scanning section setting block 256a and a sub scanning section setting block 256b, and a section control block 256c.

The circuit elements relating to the brightness comparator 251 operate in the following manner.

Each of the comparing block 251a and the brightness data memory block 251b receives the digital image data sent from the A/D conversion circuit 214. The comparing block 251a receives an output signal of the brightness data memory block 251b and compares the brightness of a previously stored image data with the brightness of a newly entered image data. When the newly entered image data is brighter than the previously stored image data, the brightness data memory block 251b replaces its memory contents by the brightness of this newly entered image data. In other words, the brightness data memory block 251b repeats the renewal operation and stores the brightest image data thus renewed in response to every occurrence of a brighter image data. The data stored in the brightness data memory block 251b serves as brightness data. This embodiment provides a total of 15 grades to classify the brightness of the image data. The grade number increases with increasing brightness.

The subtracting block 251c receives the brightness data produced from the brightness data memory block 251b and a darkness margin sent from the margin memory block 255, and subtracts the darkness margin from the brightness data. The darkness upper limit memory block 251d receives the subtraction result produced from the subtracting block 251c. In other words, the darkness upper limit memory block 251d stores the subtraction result of the subtracting block 251c as a renewed darkness upper limit value. The darkness upper limit value is used in the bright-dark judgement, according to which a concerned image data is identified as not belonging to a dark region when its brightness value is within the predetermined margin (i.e., darkness margin) from the brightest value.

The circuit elements relating to the darkness comparator 252 operate in the following manner.

Each of the comparing block 252a and the darkness data memory block 252b receives the digital image data sent from the A/D conversion circuit 214. The comparing block 252a receives an output signal of the darkness data memory block 252b and compares the darkness of a previously stored image data with the darkness of a newly entered image data. When the newly entered image data is darker than the previously stored image data, the darkness data memory block 252b replaces its memory contents by the darkness of this newly entered image data. In other words, the darkness data memory block 252b repeats the renewal operation and stores the darkest image data thus renewed in response to every occurrence of a darker image data. The data stored in the darkness data memory block 252b serves as darkness data. As described above, this embodiment provides 15 brightness grades. The grade number decreases with increasing darkness.

The adding block 252c receives the darkness data produced from the darkness data memory block 252b and a brightness margin sent from the margin memory block 255, and adds the brightness margin to the darkness data. The brightness lower limit memory block 252d receives the addition result produced from the adding block 252c. In other words, the brightness lower limit memory block 252d stores the addition result of the adding block 252c as a renewed brightness lower limit value. The brightness lower limit value is used in the bright-dark judgement, according to which a concerned image data is identified as not belonging to a bright region when its brightness value is within the predetermined margin (i.e., brightness margin) from the darkest value.

The circuit elements relating to the bright-dark judging unit 253 operate in the following manner.

The diving block 253a receives the brightness data from the brightness data memory block 251b as well as the darkness data from the darkness data memory block 252b, and calculates an average of two entered data, i.e., ½×(brightness data+darkness data), to produce a mid value. The mid value memory block 253b stores the mid value thus obtained.

The digital image data is sent to each of the brightness comparing block 253c, the darkness comparing block 253d and the mid value comparing block 253e. The brightness comparing block 253c compares the received digital image data with the brightness lower limit value sent from the brightness lower limit memory block 252d, and sends a comparison result to the bright-dark judging block 253f. The darkness comparing block 253d compares the received digital image data with the darkness upper limit value sent from the darkness upper limit memory block 251d, and sends a comparison result to the bright-dark judging block 253f. The mid value comparing block 253e compares the received digital image data with the mid value sent from the mid value memory block 253b, and sends a comparison result to the bright-dark judging block 253f.

The bright-dark judging block 253f performs the bright-dark judgement in the following manner.

The bright-dark judging block 253f checks the comparison result of the brightness comparing block 253c and the comparison result of the mid value comparing block 253e. When the input value is not smaller than the mid value and also is not smaller than the brightness lower limit value, the bright-dark judging block 253f judges that the image data belongs to a bright region.

Moreover, the bright-dark judging block 253f checks the comparison result of the darkness comparing block 253d and the comparison result of the mid value comparing block 253e. When the input value is smaller than the mid value and also is not larger than the darkness upper limit value, the bright-dark judging block 253f judges that the image data belongs to a dark region.

According to the bright-dark judgment, 1 is produced for every detected brightness and 0 is produced for every detected darkness. When the conditions of the above bright-dark judgements are not satisfied, the previous judgement is maintained. The judgement result of the bright-dark judging block 253f is sent to the two-dimensional image memory 220c of the image memory 220 and also sent to each of the immediate value memory circuit 253g and the comparing block 253h. The comparing block 253h compares the output value of the bright-dark judging block 253f with an immediate value stored in the immediate value memory circuit 253g. The comparing block 253h sends an output signal to the counter 254 only when the output value of the bright-dark judging block 253f is different from the immediate value stored in the immediate value memory circuit 253g. In other words, in response to every change of the brightness, the counter 254 receives the output signal from the comparing block 253h. Thus, the counter 254 counts the number of brightness change points based on the output signal of the comparing block 253h. The output (i.e., count value) of the counter 254 is sent to the change point count memory 220b of the image memory 220.

The circuit elements relating to the block address control circuit 256 operate in the following manner.

The section control block 256c is responsive to the address control signal sent from the address generating circuit 217, and performs the search section control in accordance with settings of the main scanning section setting block 256a and the sub scanning section setting block 256b. More specifically, the section control block 256c controls the storing address of a change point count value of each search section based on section points on the main scanning line as well as section points on the sub scanning line, and also controls the counter 254. The section control signal produced from the section control block 256c is also sent to the change point count memory 220b of the image memory 220.

The main scanning section setting block 256a and the sub scanning section setting block 256b are controlled by the read/write signal sent from the control unit 210. The darkness upper limit memory block 251d, the brightness lower limit memory block 252d, the mid value memory block 253b, and the margin memory block 255 are also controlled by the read/write signal sent from the control unit 210.

The above-described information code reading apparatus 201 operates in the following manner. First, the CCD areal sensor 212 picks up the image of a two-dimensional code in response to the instruction sent from the control unit 210. The CCD areal sensor 212 generates the analog scanning line signal representing the two-dimensional image data of the picked-up code. The amplification circuit 213 amplifies this analog scanning line signal. The A/D conversion circuit 214 converts the analog scanning signal into the digital data. The image data memory 220 a of image memory 220 temporarily stores the digital data of one complete CCD image which is picked-up at a time by the CCD areal sensor 212.

Figure 4B:
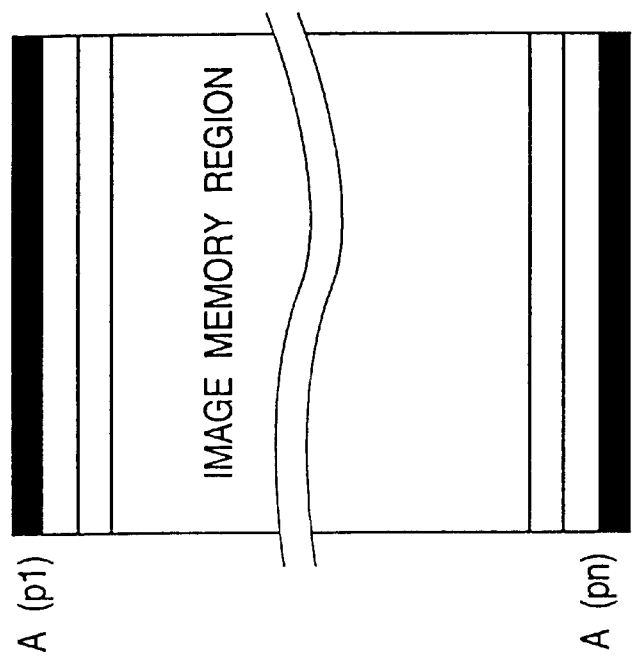
FIG. 4B is a view showing the address allocation in the image memory.
Figure 4A:
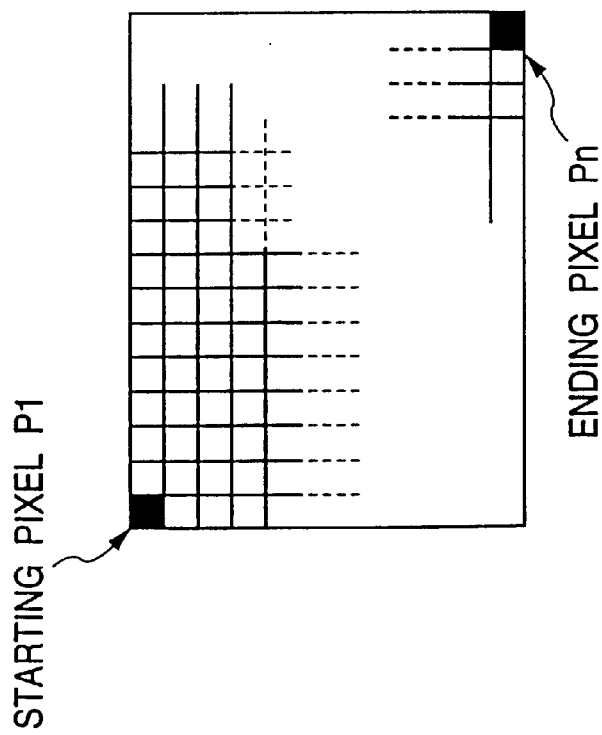
FIG. 4A is a view showing the arrangement of pixels.

More specifically, as shown in FIG. 4A, the CCD image is dissectable into a total of "n" pixels arranged in a predetermined matrix pattern. The pixel "P1", positioned at an upper left edge, is designated as a starting pixel from which the scanning operation starts. The scanning point moves along a lateral scanning line in the direction from left to right on the CCD image. When the scanning point reaches the right edge on the CCD image, the scanning point returns the left edge and the scanning operation resumes along the next lateral scanning line located immediately below. As a result of such repetitive scanning operations, the scanning point reaches the final pixel "Pn", which is positioned at a lower right edge.

Furthermore, as shown in FIG. 4B, the image data memory 220a has an image memory region identified by addresses A(p1), - - -, A(pn) which stores the scanned image data in the scanning order (P1, - - -, Pn). The later-described processing is performed by using the data stored in the image data memory 220a. However, to expedite visual understanding, this embodiment uses a two-dimensional image region corresponding to the CCD image shown in FIG. 4A.

According to the information code reading operation of the first embodiment, the setting of a search area on the CCD image is determined in the following manner.

As shown in FIG. 5A, the CCD image region is divided into a plurality of rectangular sections arranged in a matrix pattern, dissected by parallel horizontal lines extending in the main scanning line direction and parallel vertical lines extending in the sub scanning line direction. This arrangement is preferable to process the image data entered from CCD areal sensor 212, because the CCD image consists of pixels arranged in a matrix pattern parallel to the main scanning line direction and the sub scanning line direction.

As shown in FIG. 5A, the CCD image region is dissected into a plurality of search sections; i.e. "G" sections in the lateral direction×"H" sections in the vertical direction. Each search section consists of a plurality of pixels; i.e. "a" pixels in the lateral direction×"b" pixels in the vertical direction. To expedite the understanding, this embodiment uses a simplified model shown in FIG. 5A, according to which G=10, H=8, and a=b=8. In other words, the CCD image region consists of 80 pixels (in the lateral direction)×64 pixels (in the vertical direction). However, when practically used, it is preferable to change the size to 640 pixels×480 pixels in view of the attainable resolution level.

It is now assumed that one search section includes part of the image of a two-dimensional code. The brightness change points are counted along each main scanning line. Namely, as shown in FIG. 5B, eight main scanning lines detect changes points of 0, 0, 2, 2, 2, 2, 2, 2, respectively, with a cumulative value of the detected brightness change points rising to 12. In other words, this search section includes a total of 12 brightness change points. In this manner, the total number of the brightness change points is counted in each search section.

More specifically, the counting operation of the brightness change points is performed in the following manner.

The image data of each pixel is entered from the CCD areal sensor 212, and a mid value is obtained by comparing the input value with the brightest image data already detected. The obtained mid value is used as a reference value for the bright-dark judgement. As described above, the brightness of the image data ranges from 1 to 15 grades. The number increases with increasing brightness. For example, when the initial input data is 15, both of the bright data and the dark data become 15. The mid value becomes 15 accordingly. As long as 15 is successively entered, there in no change in each of the bright data, dark data, and mid value. However, when 9 is entered, the dark data is renewed to 9 and the mid value becomes 12. Similarly, when 1 is entered, the dark data is renewed to 1 and the mid value becomes 8. This mid value is a convergent value. In other words, the mid value is no longer renewed. According, after this moment, the bright-dark judgement is performed with the reference value of 8.

The bright-dark judgement is basically a comparison between an input value and the mid value. The judgement results in "bright" when input value≧mid value and results in "dark" when input value<mid value. To enhance the certainty of the bright-dark judgement, this embodiment provides a dead or neutral (i.e., insensible) zone. More specifically, when input value≧brightness lower limit is not satisfied, the judged "brightness" is canceled even when input value≧mid value is satisfied. Similarly, when input value≦darkness upper limit is not satisfied, the judged "dark" is canceled even when input value<mid value is satisfied. Namely, the judgement "bright" is recognized only when the input value is not smaller than the mid value and also is not smaller than the brightness lower limit. The judgement "dark" is recognized only when the input value is smaller than the mid value and also is not larger than the darkness upper limit. Otherwise, the bright-dark judgement is suspended and the previous judgement result is maintained.

The following shows the practical example. In this example, the darkness upper limit is assumed to be 10 (=15 (i.e., maximum value)−5 (i.e., darkness margin)). The calculations obtains the mid value by counting fractions as one.

And, × represents a case where the dark-bright judgement is unfeasible.

| Input Number | ① | ② | ③ | ④ | ⑤ | ⑥ | ⑦ | ⑧ |
|---|---|---|---|---|---|---|---|---|
| Input Value | 15 | 15 | 8 | 1 | 1 | 1 | 8 | 15 |
| Maximum Value (bright) | 15 | 15 | 15 | 15 | 15 | 15 | 15 | 15 |
| Minimum Value (dark) | 15 | 15 | 8 | 1 | 1 | 1 | 1 | 1 |
| Mid Value | 15 | 15 | 12 | 8 | 8 | 8 | 8 | 8 |
| Darkness Upper Limit | 10 | 10 | 10 | 10 | 10 | 10 | 10 | 10 |
| Brightness Lower Limit | 20 | 20 | 13 | 6 | 6 | 6 | 6 | 6 |
| Bright-dark Judgement | × | × | dark | dark | dark | dark | bright | bright |

In each case of input numbers ① and ②, the input value is 15 and therefore each of the maximum value, minimum value, and mid value becomes 15. The darkness upper limit is 10, and the brightness lower limit is 20. In these cases, the bight-dark judgement is suspended because the input value (15)≧brightness lower limit (20) is not satisfied even when the input value (15)≧mid value (15) is satisfied.

In the case of input number ③, the input value decreases to 8 and therefore the minimum value becomes 8 and the mid value becomes 12. The bight-dark judgement results in "dark", because input value (8)<mid value (12) and input value (8)≦darkness upper limit (10) are both satisfied.

In the case of input number ④, the input value further decreases to 1 and therefore the minimum value becomes 1 and the mid value becomes 8. The bight-dark judgement results in "dark", because input value (1)<mid value (8) and input value (1)≦darkness upper limit (10) are both satisfied. At this moment, the maximum value (15) and the minimum value (1) are just saturated and are no longer renewed. Thus, the darkness upper limit is fixed to 10 and the brightness lower limit is fixed to 6 hereinafter.

In each case of input numbers ⑤ and ⑥, nothing changes.

In the case of input number ⑦, the input value increases to 8 again. The bight-dark judgement results in "bright" because input value (8)≧mid value (8) and input value (8)≧brightness lower limit (6) are both satisfied. Thus, the input number ⑦ is a case where the brightness change point is found. This example includes two brightness change points.

In the succeeding cases, the bight-dark judgement results in "bright" when the input value is equal to or larger than 8 and results in "dark" when the input value is smaller than 8.

Figure 6:
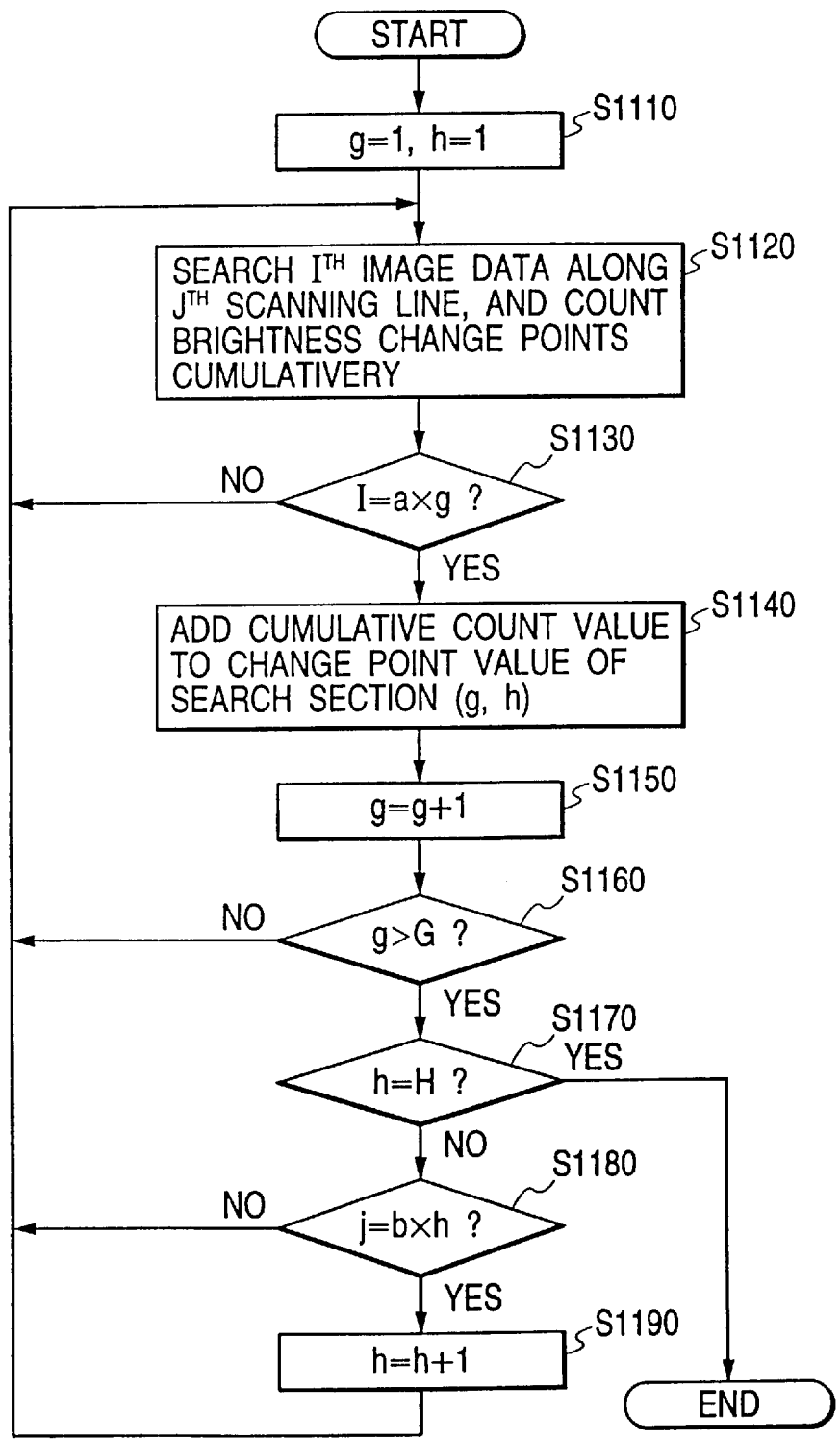
FIG. 6 is a flowchart showing the brightness change point counting operation performed in accordance with the first embodiment of the present invention.

Hereinafter, the brightness change point detecting processing of the first embodiment will be explained with reference to the flowchart of FIG. 6 which is performed by the control unit 210 (i.e., CPU).

In step S1110, both of variables "g" and "h" are initialized (i.e., g=1 and h=1). In step S1120, the Ith image data is searched along the Jth scanning line to count the brightness change points cumulatively.

In step S1130, it is checked whether I is equal to a×g, wherein I represents the position of searched image data. In other words, step S1130 checks wether the search operation for a total of "g" search sections aligned in the lateral direction is completely finished along the main scanning line.

When I is not equal to a×g (i.e., NO in step S1130), the control flow returns to the step S1120. When I is equal to a×g (i.e., YES in step S1130), the control flow proceeds to step S1140.

In step S1140, the cumulative count value obtained in the step S1120 is added to the present change point count value of the search section (g, h). The added result is stored as a renewed change point count value of the search section (g, h).

In step S1150, the variable "g" is incremented by 1 (i.e., g=g+1). Then, in step S1160, it is checked wether the variable "g" is larger than the total number G of the search sections aligned in the lateral direction of the CCD image region (i.e., matrix shown in FIG. 12A). The step S1160 is necessary to check whether the search operation is finished completely along a main scanning line (i.e., in the entire lateral direction of the CCD image region). When g≦G (i.e., NO in step S1160), the control flow returns the step S1120. When g>G (i.e., YES in step S1160), the control flow proceeds to step S1170.

In the step S1170, it is checked whether the variable "h" is equal to the total number H of the search sections aligned in the vertical direction of the CCD image region (i.e., matrix shown in FIG. 5A). The step S1170 is necessary to check whether the search operation is finished completely along a sub scanning line (i.e., in the entire vertical direction of the CCD image region). When h≠H (i.e., NO in step S1170), the control flow proceeds to the step S1180 to further check whether J is equal to b×h. The step S1180 is necessary to check whether the search operation in the main scanning line is completed for "h" search sections aligned in the vertical direction. When J≠b×h (i.e., NO in step S1180), the control flow returns to the step S1120. When J=b×h (i.e., YES in step S1180), it is concluded that the search operation in the main scanning line is thoroughly finished for all of "h" search sections aligned in the vertical direction. Thus, the control flow proceeds to step S1190 to increment the variable "h" by 1 (i.e., h=h+1), and then returns to the step S1120. When the judgement result becomes YES, i.e., h=H in the step S1170, it is concluded that the searching operation for all of the search sections in the CCD image region is entirely completed. Then, the routine of FIG. 6 is terminated.

FIG. 5C shows a brightness change point count table as a result obtained through the above brightness change point detecting processing. In general, thin lines or small points are negligible as their brightness changes within a pixel. Too much thick lines or large points are also negligible as the total number of the brightness changes becomes small. Thus, there is a likelihood that the information code is present when a search area has a higher count value with respect to the bright-dark change point.

Figure 7:
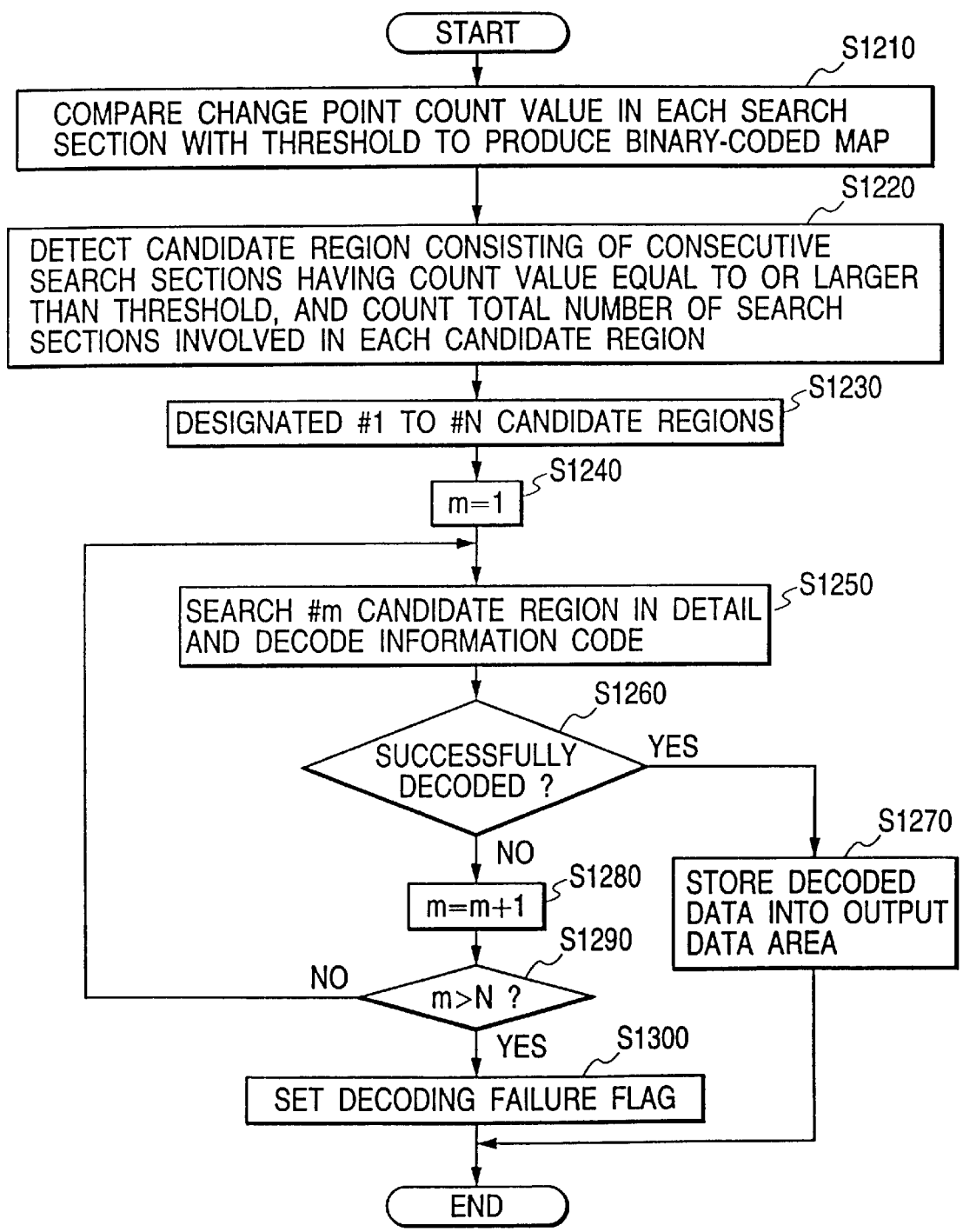
FIG. 7 is a flowchart showing the method for estimating an information code existing area and reading the contents of this information code in accordance with the first embodiment of the present invention.

FIG. 7 is a flowchart showing the processing for estimating an existing area of an information code and reading the content of the detected information code.

Figure 8A:
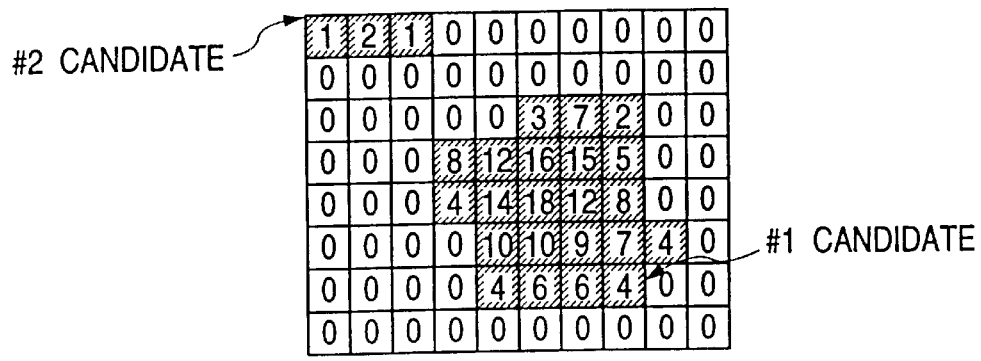
FIG. 8A is a view showing a binary-coded map obtained in the first embodiment of the present invention.

In step S1210, the change point count value of each search section is compared with a predetermined threshold to produce a binary-coded map. FIG. 8A shows an example of the binary-coded map, which is obtained by using 1 as the predetermined threshold. The shaded portion represents the region consisting of search sections having the change point count value equal to or larger than 1. The threshold value can be appropriately determined. For example, a preferable threshold may be an interior division point between the minimum and maximum values divided by one third from the minimum value. When the maximum value is 18 and the minimum value is 0, one third of the difference between the maximum value and the minimum value is 6, i.e., ⅓×(18−0). The preferable threshold becomes 6 (=0+6).

Returning step S1220 of FIG. 7, consecutive search sections each having the count value equal to or larger than the threshold is identified as a candidate region having a higher likelihood of including the information code. The number of the search sections included in the candidate region is counted.

In step S1230, the detected candidate regions, when satisfying the predetermined given conditions, are successively designated as #1 candidate region, #2 candidate region #3, - - -, #N candidate region.

Figure 8B:
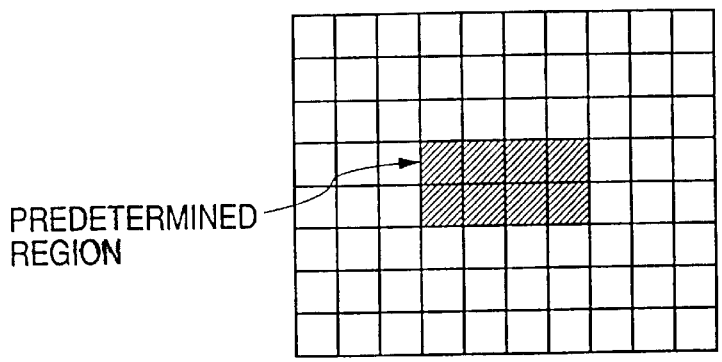
FIG. 8B is a view showing a predetermined region used in the judgement for determining priority order of candidate regions of information code existing area in accordance with the first embodiment of the present invention.

The number of each candidate region represents the priority order which is determined based on the given conditions. For example, a primary condition is whether at least part of the candidate region exists within a predetermined area located at the center of the CCD image region (refer to FIG. 8B). A secondary condition is whether the candidate region has a large count value with respect to the total number of the search sections included therein. Accordingly, the candidate region positioned near the center of the CCD image and consisting of many consecutive search sections becomes #1 candidate region.

In the photographing operation, the user tends to pick up a CCD image with an information code positioned near the center thereof. Hence, using the above primary condition is effective to smoothly identify or find out the existing position of the information code.

In general, there is a tendency that the candidate region truly involving the information code has a large size. Thus, using the above secondary condition is effective to smoothly identify or find out the existing position of the information code.

Returning step S1240 of FIG. 7, the variable "m" is reset to the initial value 1 (i.e., m=1).

Next, in step S1250, #m candidate region is searched carefully to decode (i.e., decipher or interpret) the information code. The code decoding processing performed in the step S1250 is chiefly separated into the information code area detecting processing and the code reading processing.

Figure 8C:
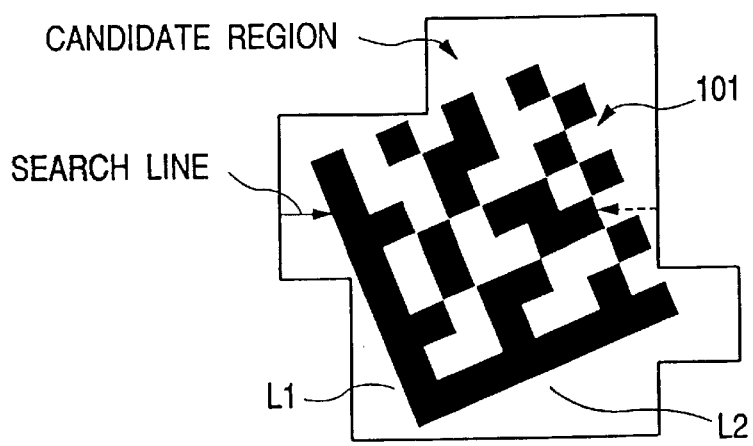
FIG. 8C is a view showing the relationship between a candidate region and an information code in accordance with the first embodiment of the present invention.

For example, the two-dimensional code (i.e., information code) 101 may exists in a certain candidate region as shown in FIG. 8C. The solid line patterns L1 and L2 of the information code 101 can be searched by using search lines parallel to the main scanning line.

However, as understood from FIG. 8C, the second embodiment draws a search line within only a limited region (i.e., within the candidate region), not the entire region of the CCD image region. Thus, it becomes possible to increase the efficiency of the search operation by reducing many of useless search operation.

After finishing the decoding operation of the information code 101, the control flow proceeds to step S 1260 to check whether the decoding of information code 101 has been performed successfully.

When the decoding operation of the information code 101 is successfully finished (i.e., YES in steep S 1260), the control flow proceeds to step S1270 to store the decoded data of the information code 101 into an output data area (not shown) of the image memory 220. Then, the routine of FIG. 7 is terminated.

When the decoding operation is failed (i.e., NO in step S1260), the control flow proceeds to step S1280 to increment the variable "m" by 1 (i.e., m=m+1). Then, in step S1290, it is checked whether the variable "m" is larger than N, wherein N represents the last candidate region. When m≦N (i.e., NO in step S1290), the control flow returns to the step S1250. When m>N (i.e., YES in step S1290), the control flow proceeds to step S1300 to set a decoding failure flag. Then, the routine of FIG. 7 is terminated.

As described above, the first embodiment dissects the CCD image region on the image data memory into a plurality of search sections, counts the brightness change points based on the image data included in each of the dissected search sections, and detect a candidate region having a likelihood of involving the information code. The detected candidate region is estimated as an information code existing area.

According to the first embodiment, it becomes possible to increase the search efficiency because the substantial search area is narrowed (i.e., the substantial search line is reduced). The required calculative processing is basically the comparison between the count value and the threshold in counting the brightness change points. Thus, the calculative burden is relatively small. In other words, the first embodiment substantially reduces the time required for completing the code reading processing.

Furthermore, the information code area estimating operation is a sort of preprocessing operation performed beforehand for the succeeding code information reading operation. The first embodiment performs the above brightness change point counting operation in parallel with the storing operation of the image data outputted from the A/D conversion circuit 214 into the image data memory 220a. This is also effective to reduce the overall processing time required.

The size of each search section is not limited to the one disclosed in this embodiment. For example, when a cell size easy to find is 5×5 pixels, a preferable search section will have a size somewhere in the range from 16×16 pixels to 32×32 pixels.

The information code consists of a plurality of cells arranged in a two-dimensional pattern. Each of the search sections is larger than a minimum size of the cell on the image data memory. Preferably, each search section is larger than two times the minimum size of the cell on the image data memory. For example, when two bright cells (or two dark cells) are positioned next to each other, the brightness change point can be surely detected by setting each search section to be larger than two times the minimum size of the cell on the image data memory.

Second Embodiment

Like the above-described first embodiment, the third embodiment is realized on the information code reading apparatus 201 explained with reference to FIGS. 1 to 13.

The second embodiment is characteristic in that the setting of search sections is hierarchical.

Figure 9D:
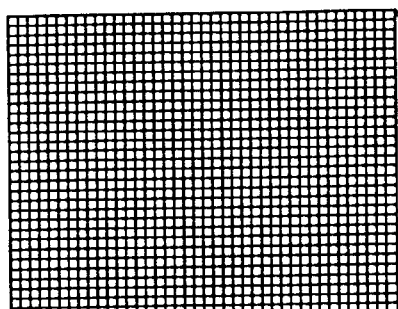
FIGS. 9A to 9E are views explaining the setting of hierarchical search sections in accordance with a second embodiment of the present invention.
Figure 9E:
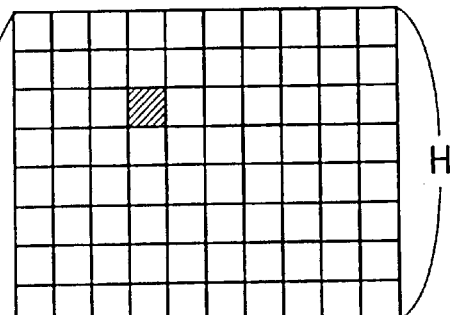
Figure 9A:
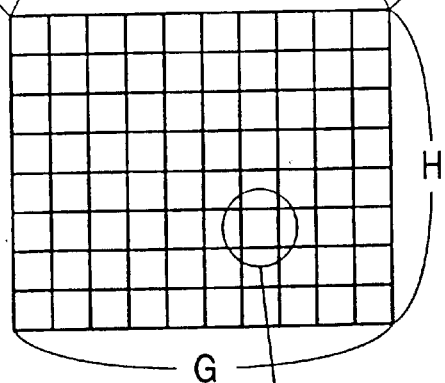
Figure 9C:
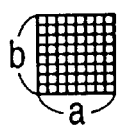
Figure 9B:
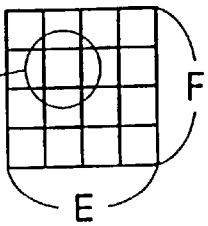

The image region is dissected into a plurality of large search sections constituting a matrix of G×H (refer to FIG. 9A). Each large search section is dissected into a plurality of small search sections constituting a matrix of E×F (refer to FIG. 9B). Each small search section consists of a plurality of (i.e., a×b) pixels (refer to FIG. 9C).

To expedite the understanding, this embodiment shows a simplified hierarchical arrangement consisting of only two hierarchical levels. However, it is of course possible to increase the number of hierarchical levels to three or more.

The method for counting the brightness change points in each search section is basically identical with that of the first embodiment.

However, according to the second embodiment, the brightness change point count table is obtained for the large search sections (refer to FIG. 9E) and also for the small search sections (refer to FIG. 9D).

Figure 10:
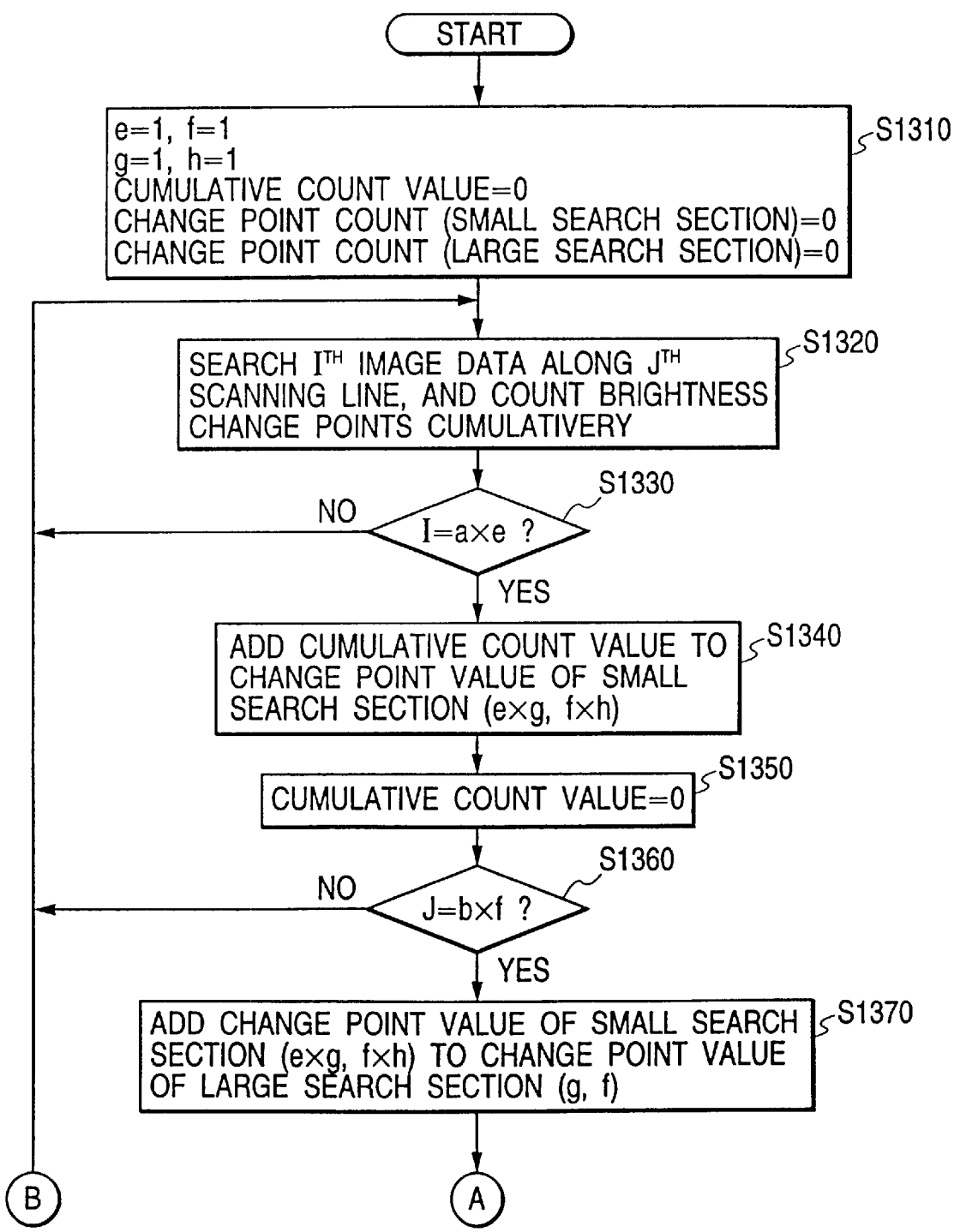
FIGS. 10 and 11 are collectively a flowchart showing the brightness change point counting operation performed in accordance with the second embodiment of the present invention.
Figure 11:
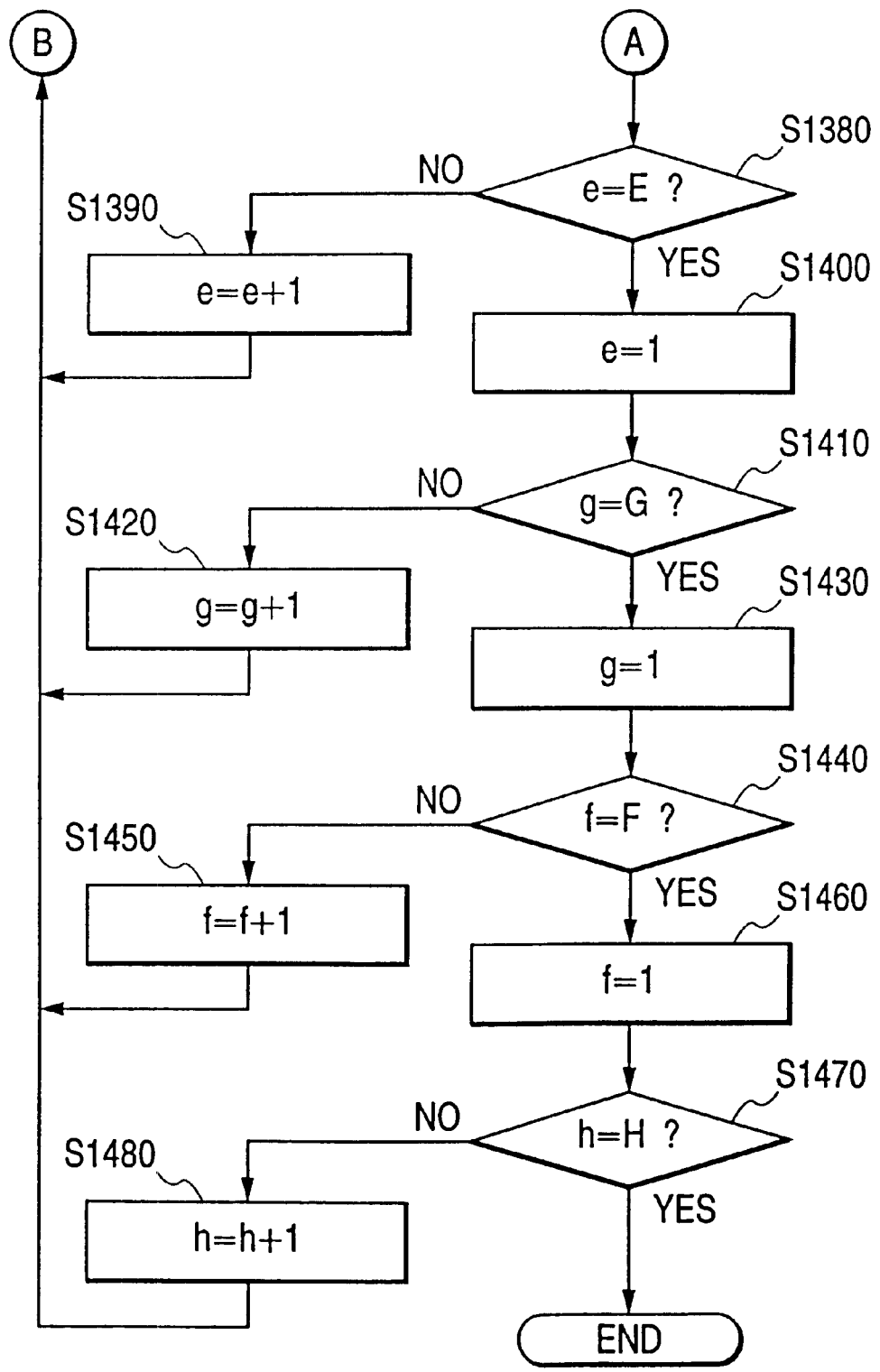

Hereinafter, the brightness change point detecting processing of the second embodiment will be explained with reference to the flowchart of FIGS. 10 and 11 which is performed by the control unit 210 (i.e., CPU).

In step S1310, all of variables are initialized (i.e., e=1, f=1, g=1, h=1, cumulative count value=0, change point count for small search sections =0, and change point count for large search sections =0).

In step S1320, the $I^{th}$ image data is searched along the $J^{th}$ scanning line to count the brightness change points cumulatively.

In step S1330, it is checked whether I is equal to a×e, wherein I represents the position of searched image data. In other words, step S1330 checks whether the search operation for a total of "e" small search sections aligned in the lateral direction is completely finished along the main scanning line.

When I is not equal to a×e (i.e., NO in step S1330), the control flow returns to the step S1320. When I is equal to a×e (i.e., YES in step S1330), the control flow proceeds to step S1340.

In step S1340, the cumulative count value obtained in the step S1320 is added to the present change point count value of the small search section (e×g , f×h). The added result is stored as a renewed change point count value of the small search section (e×g, f×h). Then, in step S1350, the cumulative count is reset to 0.

In step S1360, it is checked whether J is equal to b×f, wherein J represents the scanning line number. The step S1360 is necessary to check whether. the search operation in the main scanning line is completed for all of "f" small search sections aligned in each vertical direction. When J_b×f (i.e., NO in step S1360), the control flow returns to the step S1320. When J=b×h (i.e., YES in step S1360), it is concluded that the search operation is thoroughly finished for all of "f" small search sections aligned in each vertical direction. Thus, the control flow proceeds to step S1370.

In step S1370, the change point count value of the small search section (e×g, f×h) obtained in the step S1340 is added to the change point count value of the large search section (g, f). The added result is stored as a renewed change point count value of the large search section (g, f).

Then, the control flow proceeds to step S1380 to check whether the variable "e" is equal to E (i.e., e=E ?). The step S1380 is necessary to check wether the search operation in the main scanning line is thoroughly completed for all of a total of "E" small search sections aligned on a same lateral line of one large search section. When e_E (i.e., NO in step S1380), the control flow proceeds to step S1390 to increment the variable "e" by 1 (i.e., e=e+1), and then returns to the step S1320. When e=E (i.e., YES in step S1380), the control flow proceeds to step S1400 to initialize the variable "e" (i.e., e=1).

In step S1410, it is checked whether the variable "g" is equal to G (i.e., g=G?). The step S 1410 is necessary to check whether the search operation in the main scanning line is thoroughly completed for all of a total of "G" large search sections aligned on a same lateral line of one CCD image region. When g≠G (i.e., NO in step S1410), the control flow proceeds to step S1420 to increment the variable "g" by 1 (i.e., g=g+1), and then returns to the step S1320. When g=G (i.e., YES in step S1410), the control flow proceeds to step S 1430 to initialize the variable "g" (i.e., g=1).

Then, the control flow proceeds to step S1440 to check whether the variable "f" is equal to F (i.e., f=F?). The step S1440 is necessary to check whether the search operation in the main scanning line is thoroughly completed for all of a total of "F" small search sections aligned on each vertical line of one large search section. When f≠F (i.e., NO in step S1440), the control flow proceeds to step S1450 to increment the variable "f" by 1 (i.e., f=f+1), and then returns to the step S1320. When f=F (i.e., YES in step S1440), the control flow proceeds to step S1460 to initialize the variable "f" (i.e., f=1).

In step S1470, it is checked whether the variable "h" is equal to H (i.e., h=H?). The step S1470 is necessary to check whether the search operation in the main scanning line is thoroughly completed for all of a total of "H" large search sections aligned on each vertical line of one CCD image region. When h≠H (i.e., NO in step S1470), the control flow proceeds to step S1480 to increment the variable "h" by 1 (i.e., h=h+1), and then returns to the step S1320. When h=H (i.e., YES in step S1470), this routine is terminated.

As a result of the above-described brightness change point counting operation, the second embodiment obtains the brightness change point count table of FIG. 9D for the small search sections as well as the brightness change point count table of FIG. 9E for the large search sections.

Figure 12:
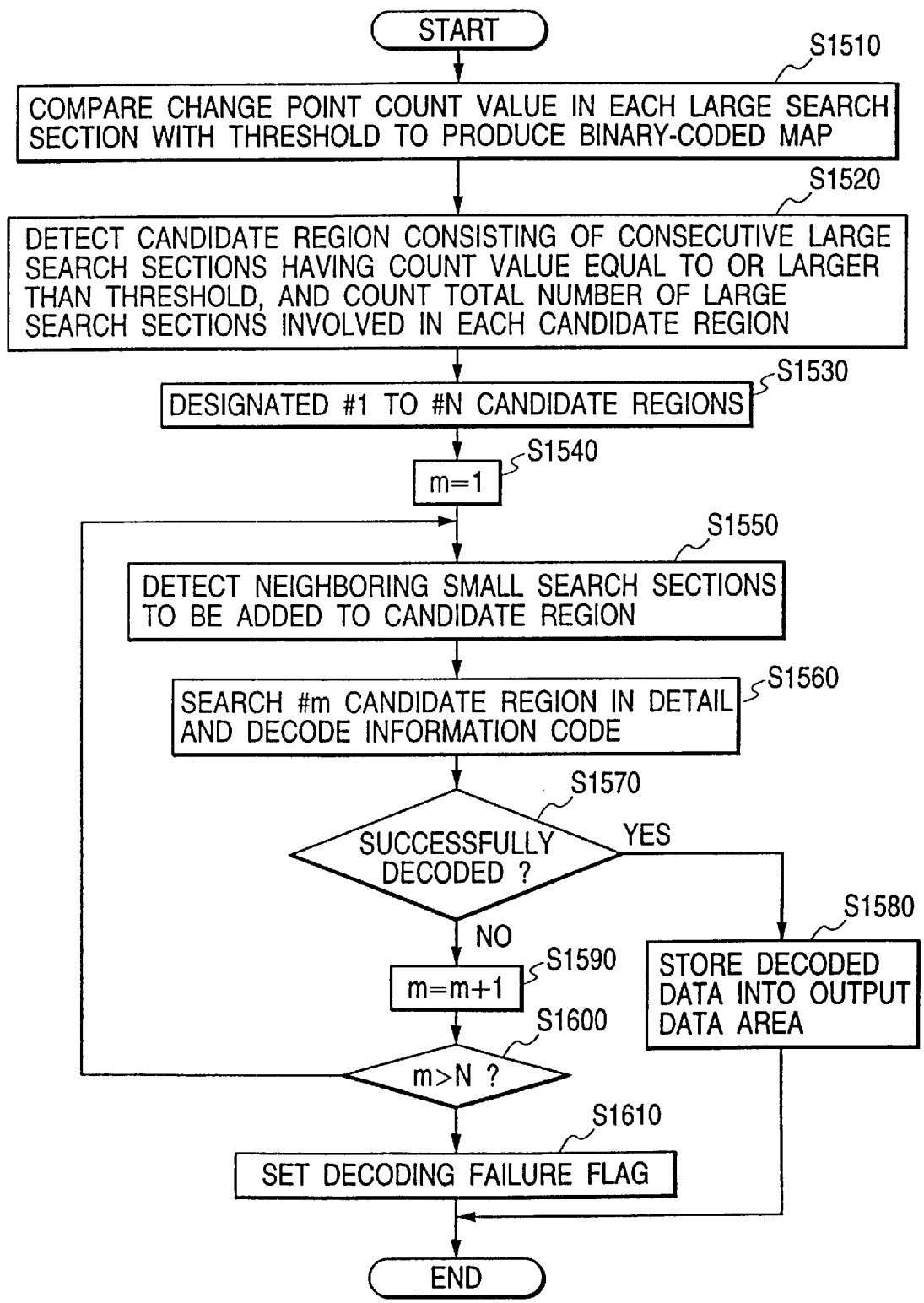
FIG. 12 is a flowchart showing the method for estimating an information code existing area and reading the contents of this information code in accordance with the second embodiment of the present invention.

FIG. 12 is a flowchart showing the processing for estimating an existing area of an information code and reading the content of the detected information code based on the two kinds of brightness change point count tables thus obtained.

In step S1510, the change point count value of each large search section is compared with a predetermined threshold to produce a binary-coded map in the same manner as in the first embodiment explained with reference to FIG. 15A. The threshold value can be appropriately determined. For example, a preferable threshold may be an interior division point between the minimum and maximum values divided by one third from the minimum value.

In step S1520, consecutive large search sections each having the count value equal to or larger than the threshold is identified as a candidate region having a higher likelihood of including the information code. The number of the large search sections included in the candidate region is counted.

In step S1530, the detected candidate regions, when satisfying the predetermined given conditions, are successively designated as #1 candidate region, #2 candidate region #3, - - -, #N candidate region.

The number of each candidate region represents the priority order which is determined based on the given conditions. For example, a primary condition is whether at least part of the candidate region exists within a predetermined area located at the center of the CCD image region (refer to FIG. 8B). A secondary condition is whether the candidate region has a large count value with respect to the total number of the large search sections included therein. Accordingly, the candidate region positioned near the center of the CCD image and consisting of many consecutive large search sections becomes #1 candidate region.

Next, in step S1540, the variable "m" is reset to the initial value 1 (i.e., m=1).

In step S1550, for all of small search sections belonging to each large search section located in the vicinity of the #m candidate region, the change point count of each small search section is compared with a predetermined threshold to produce a binary-coded map in the same manner as in the first embodiment explained with reference to FIG. 8A.

Figure 13:
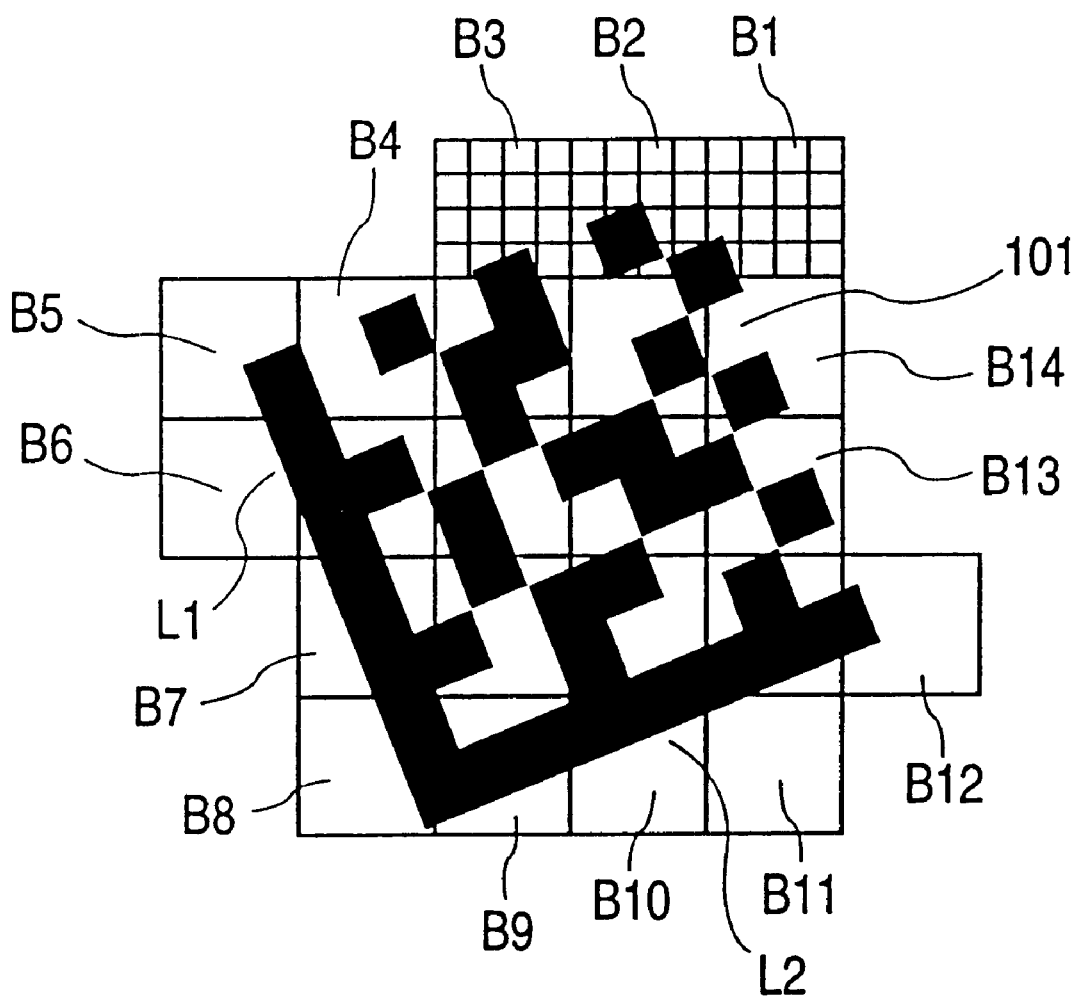
FIG. 13 is a view showing the relationship between a candidate region and an information code in accordance with the second embodiment of the present invention.

For example, as shown in FIG. 13, a plurality of large search sections B1 to B14 are positioned in the vicinity of the candidate region. Each of large search sections B1 to B14 includes a plurality of small search sections. The step S1550 is applied to each small search section belonging to such a neighboring large search section. The threshold value used in this comparison can be appropriately determined. For example, a preferable threshold may be an interior division point between the minimum and maximum values divided by one third from the minimum value.

As a result of the step S1550, the neighboring small search sections having a change point count value equal to or smaller than the predetermined threshold are added to the #m candidate region.

Next, in step S1560, #m candidate region is searched carefully to. decode (i.e., decipher or interpret) the information code. The step S 1560 performs the processing substantially in the same manner as the step S1250 of the first embodiment.

Namely, the step S1560 performs the search operation in a limited region (i.e., #m candidate region of FIG. 13), to find out the solid line patterns L1 and L2 of the information code 101 by using search lines parallel to the main scanning line. The detected information code 101 is decoded based on the bright-dark pattern.

Then, the control flow proceeds to step S1570 to check whether the decoding of information code 101 has been performed successfully.

When the decoding operation of the information code 101 is successfully finished (i.e., YES in steep S1570), the control flow proceeds to step S1580 to store the decoded data of the information code 101 into an output data area (not shown) of the image memory 220. Then, the routine of FIG. 19 is terminated.

When the decoding operation is failed (i.e., NO in step S1570), the control flow proceeds to step S1590 to increment the variable "m" by 1 (i.e., m=m+1). Then, in step S1600, it is checked whether the variable "m" is larger than N, wherein N represents the last candidate region. When m≦N (i.e., NO in step S1600), the control flow returns to the step S1550. When m>N (i.e., YES in step S1600), the control flow proceeds to step S1610 to set a decoding failure flag. Then, the routine of FIG. 12 is terminated.

As described above, the second embodiment dissects the CCD image region on the image data memory into a plurality of large search sections, counts the brightness change points based on the image data included in each of the dissected large search sections, and detect a candidate region having a likelihood of involving the information code. Furthermore, small search sections belonging to a neighboring large search section are checked whether they should be added to the candidate region. To this end, the change point count value in each neighboring small search section is compared with a predetermined threshold. Thus, the second embodiment makes it possible to accurately detect each candidate region as an information code existing area.

According to the second embodiment, the search efficiency is improved because of effective usage of the large and small search sections in the detection of the candidate region as well as the substantially narrowed search area (i.e., reduced search lines). The required calculative burden is relatively small. Thus, the second embodiment substantially reduces the time required for completing the code reading processing.

The size of each search section is not limited to the one disclosed in this embodiment. For example, when a cell size easy to find is 5×5 pixels, a preferable size for small search sections may be 16×16 pixels and a preferable size for large search sections may be 64×64 pixels (or 128×128 pixels).

Third Embodiment

Figure 2:
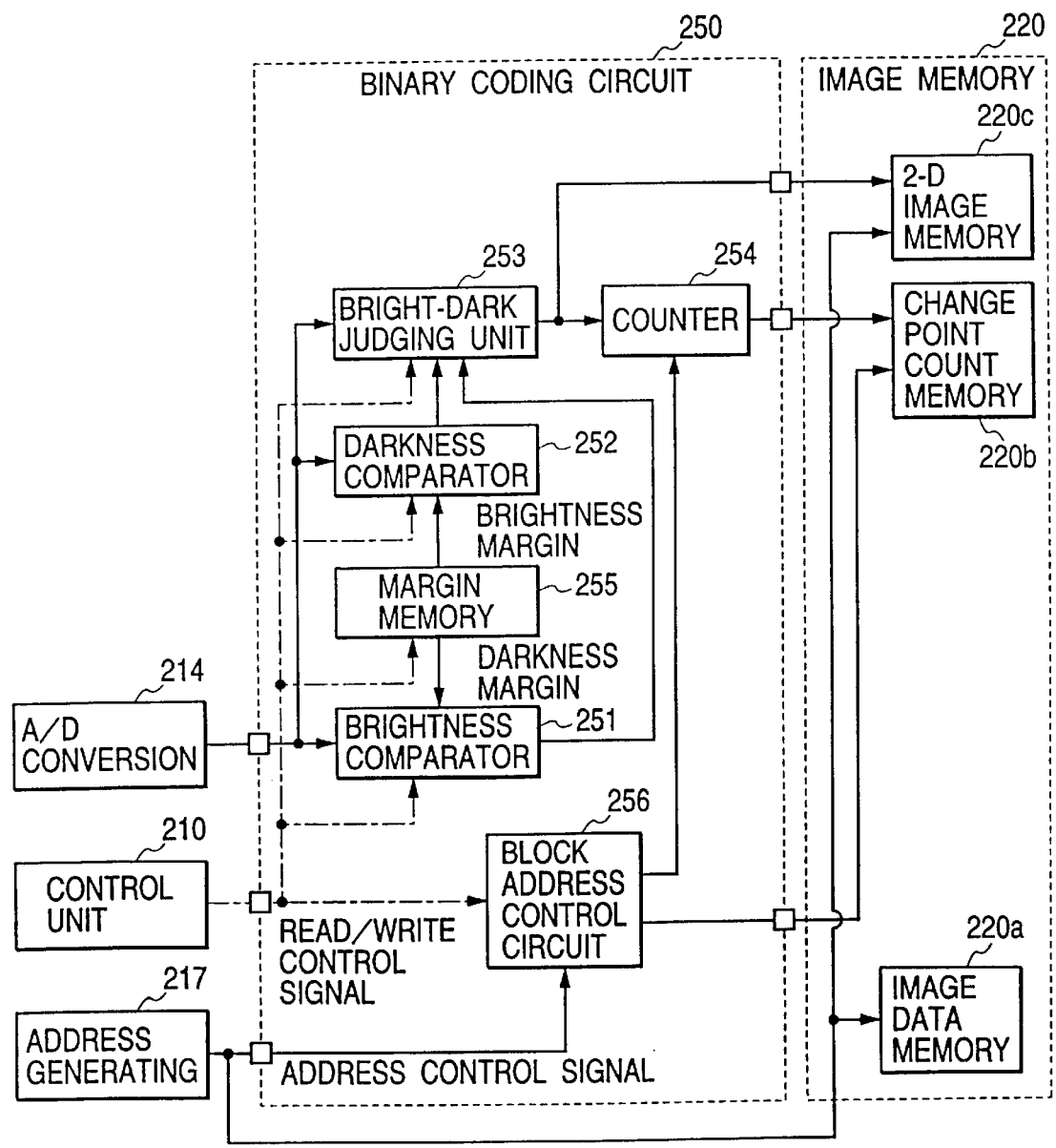
FIG. 2 is a block diagram showing the schematic arrangement of a binary coding circuit and an image memory of the information code reading apparatus in accordance with the first embodiment of the present invention.

The second embodiment includes an average calculating circuit 270 and an average value memory 220d in addition to the information code reading apparatus shown in FIGS. 1 to 3.

Figure 14:
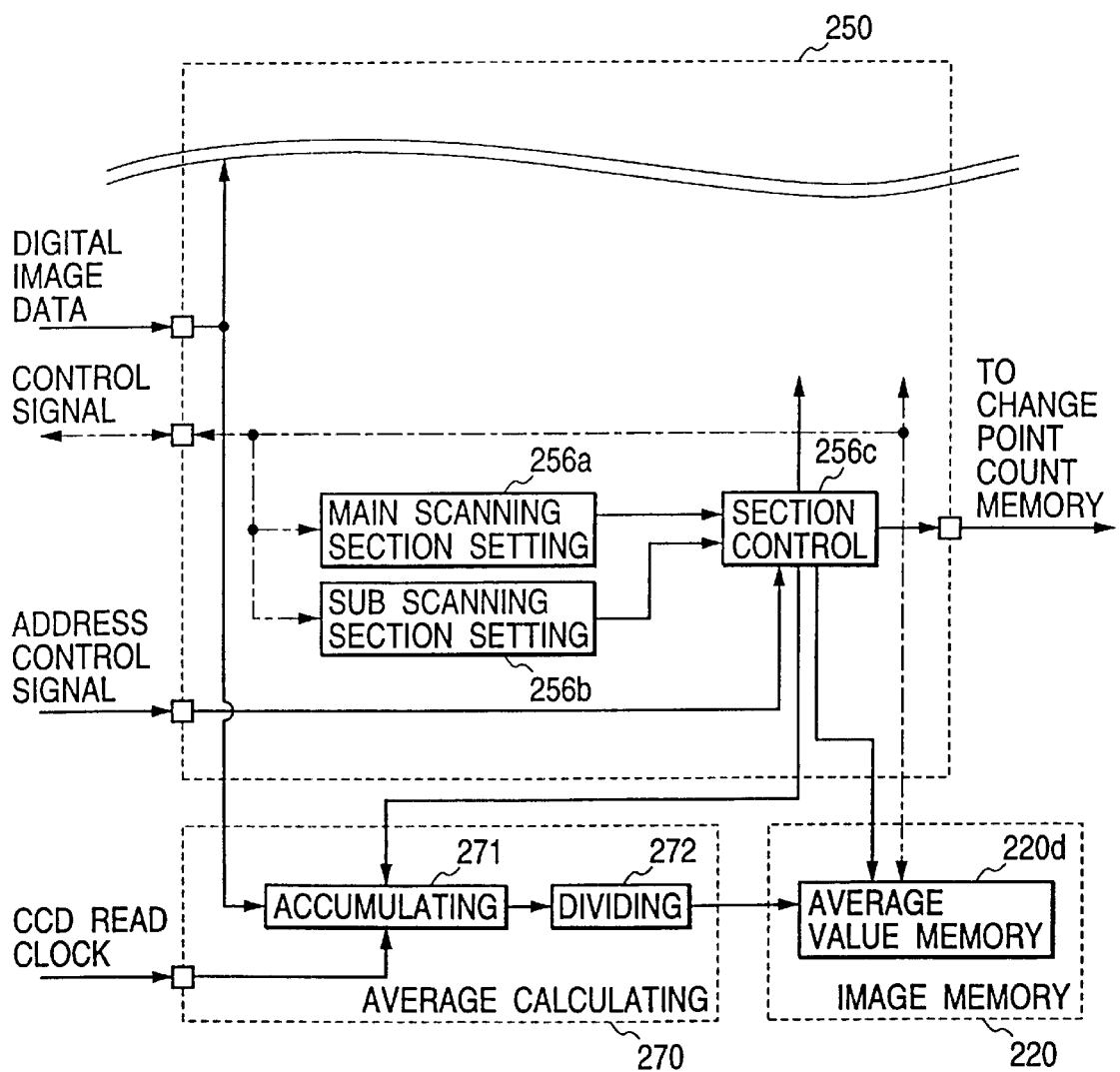
FIG. 14 is a block diagram showing the schematic arrangement of part of an information code reading apparatus in accordance with a third embodiment of the present invention.

As shown in FIG. 14, the average calculating circuit 270 includes an accumulating block 271 and a dividing block 272. The accumulating block 271 receives the digital image data and a CCD read clock. The CCD read clock is supplied from the sync pulse generating circuit 216.

The accumulating block 271 adds the digital image data cumulatively in synchronism with the CCD read clock. The dividing block 272 receives an output value of the accumulating block 271 and divides the received value by the number of pixels involved in one block to obtain an average value. The obtained average value is stored in the average value memory 220d in the image memory 220.

Figure 15:
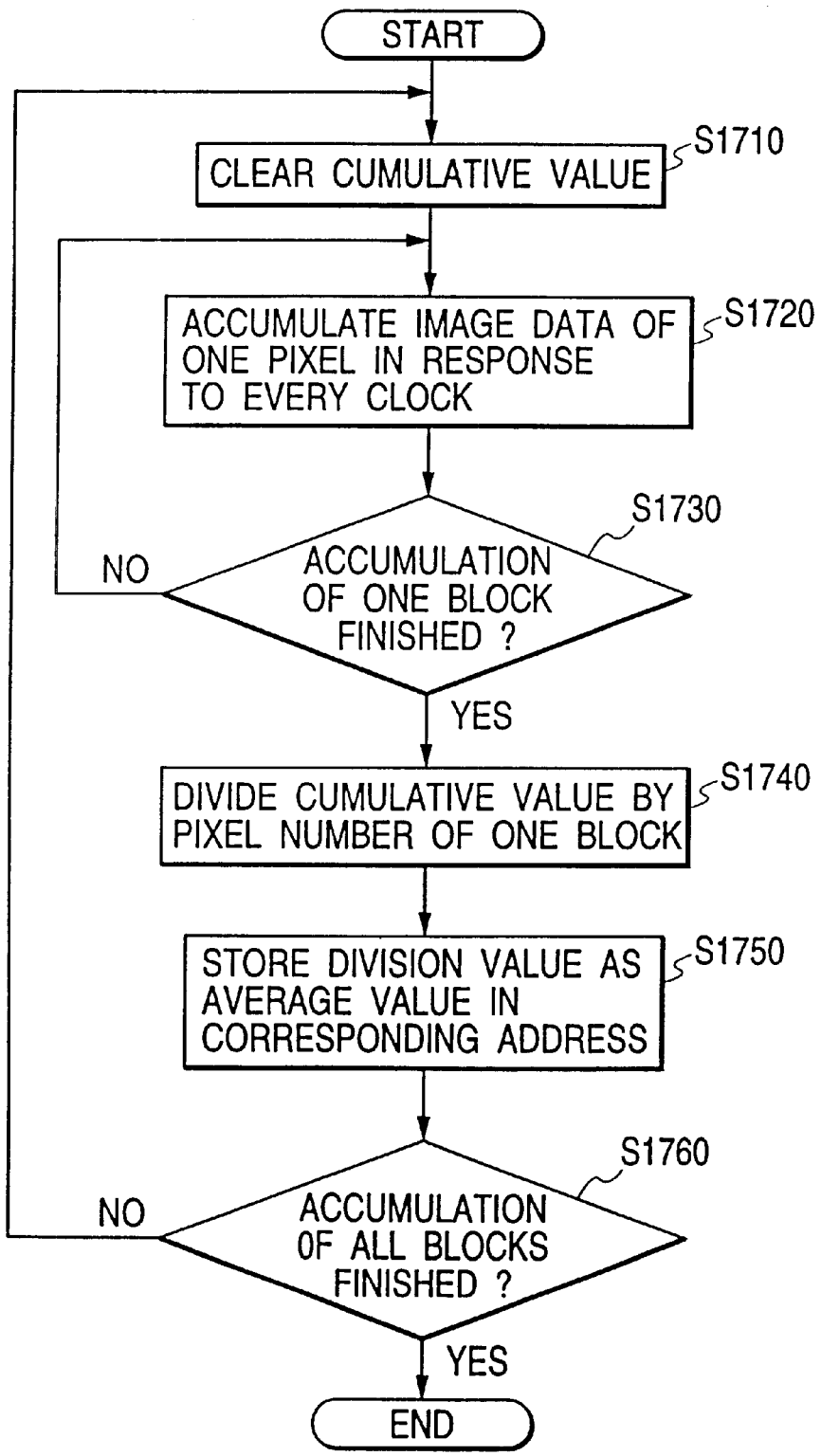
FIG. 15 is a flowchart showing an average brightness data calculating processing in accordance with the third embodiment of the present invention.
Figure 16A:
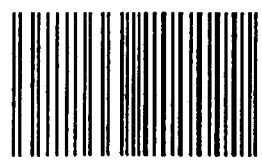
FIGS. 16A to 16E are views showing another information codes employable in the present invention.
Figure 16B:
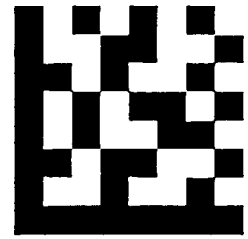
Figure 16C:
Figure 16D:
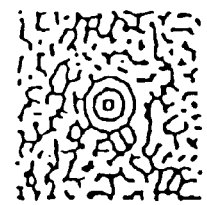
Figure 16E:
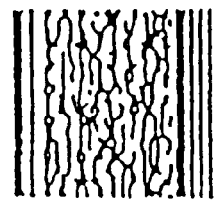

FIG. 15 is a flowchart showing the processing of calculating and memorizing an average value in accordance with the third embodiment. The fourth embodiment performs this operation in addition to the operations explained in the first or second embodiment.

In step S1710, the cumulative value is cleared. In step S1720, the image data of one pixel is accumulated in response to every CCD read clock.

When the accumulation of the image data is not finished (i.e., NO in step S1730), the processing of step S1720 is repeated. When the accumulation of the image data is finished (i.e., YES in step S1730), the control flow proceeds to step S1740 to divide the cumulative value by the pixel number of one block. Then, in step S1750, the obtained division value (representing brightness data) is stored as an average value of the received block image to a corresponding address. Then, in step S1760, it is checked whether the accumulation of all blocks is finished. When the accumulation of all blocks is not finished (i.e., NO in step S1760), the control flow returns to the step S1710 to repeat the above processing of steps S1710 to S1760. When the accumulation of all blocks is finished (i.e., YES in step S1760), this routine is terminated.

The third embodiment adds a tertiary condition in determining the priority order of the candidate regions in the step S1230 or S1530. The tertiary condition gives a higher priority to the block having a large average value in the brightness.

In the above embodiments, each search section has a square shape. However, the shape of the search section can be an oblong shape. It is also possible to use various kinds of search sections not uniform in their shape.

The information code used in the above embodiment is not limited to the information code 101 shown in FIG. 8C, and therefore can be replaced by any other available codes, for example, shown in FIGS. 16A to 16E.

The above-described method for estimating the existing area of the information code and for reading the contents of this code can be stored in an appropriate storing medium as a program installable in a computer system or a comparable digital circuit. Many of the practically available storage media, including floppy disks, magneto-optical disks, CD-ROMs, DVD-ROMs, hard disks, ROMs, backup ROMs, and their equivalents, are used for such purposes.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method for estimating an existing area of an information code, comprising the steps of:
    inputting a two-dimensional image of an information code;
    storing image data of a predetermined image region on an image data memory, said image data including the two-dimensional image of said information code; and
    estimating an existing area of said information code in said image region of said image data memory based on said stored image data,
    said method further comprising the steps of:
        dissecting said image region into a plurality of search sections;
        counting brightness change points in each of said search sections based on image data of each search section;
        detecting a candidate region having a likelihood of involving said information code based on the count value of the brightness change points;
        identifying said candidate region as said existing area of said information code;
        obtaining an average of brightness-related values of said image data involved in said search section, and using said average of brightness-related values as one of judging conditions for detecting and identifying said candidate region.

2. The information code area estimating method in accordance with claim 1, wherein said plurality of search sections are rectangular sections dissected by lines parallel to a main scanning line used for scanning said image region in a horizontal direction and also by lines parallel to a sub scanning line used for scanning said image region in a vertical direction.

3. The information code area estimating method in accordance with claim 2, wherein said information code consists of a plurality of cells arranged in a two-dimensional pattern, and each of said search sections is larger than a minimum size of said cell on said image data memory.

4. The information code area estimating method in accordance with claim 3, wherein each of said search sections is larger than two times the minimum size of said cell on said image data memory.

5. The information code area estimating method in accordance with claim 1, wherein said search sections are arranged so as to correspond to each main scanning line used in a horizontal scanning operation of said image region.

6. The information code area estimating method in accordance with claim 1, wherein each of said search sections is further dissected into a plurality of smaller search sections.

7. The information code area estimating method in accordance with claim 1, wherein said candidate region consists of consecutive search sections, and a higher priority is given to a candidate region positioned near the center of said image region when a plurality of candidate regions are detected.

8. The information code area estimating method in accordance with claim 7, wherein a higher priority is given to a candidate region having a large value in the total number of consecutive search sections involved therein.

9. The information code area estimating method in accordance with claim 1, wherein a counting operation of brightness change points is performed in parallel with a storing operation of the image data into said image data memory, and
a count table is used to obtain the relationship between the counted data of the brightness change points and corresponding search sections, so that the existing area of said information code can be estimated based the data of said count table.

10. The information code area estimating method in accordance with claim 9, wherein said counting operation of the brightness change points includes the steps of:
    renewing a memory region in response to an input of image data so as to store both a brightest data and a darkest data among brightness-related data having been ever received;
    calculating a mid value equivalent to an average of said brightest data and said darkest data;
    comparing a newly entered data with said mid value to make a bright-dark judgement; and
    counting each change in the result of said bright-dark judgement as a brightness change point.

11. The information code area estimating method in accordance with claim 10, wherein
    a darkness upper limit and a brightness lower limit are used in said bright-dark judgement, said darkness upper limit is darker than said brightest data by a predetermined darkness margin, and said brightness lower limit is brighter than said darkest data by a predetermined brightness margin,
    said bright-dark judgement results in "bright" when said newly entered data is not smaller than both of said mid value and said brightness lower limit, and results in "dark" when said newly entered data is smaller than said mid value and not larger than said darkness upper limit.

12. The information code area estimating method in accordance with claim 1, further comprising the steps of:
    scanning each search section by a plurality of scanning lines,
    counting said brightness change points along each scanning line,
    obtaining a cumulative count value by counting the number of said brightness change points cumulatively until said search section is completely scanned by said plurality of scanning lines, and
    obtaining the total number of the brightness change points of each search section based on said cumulative count value.

13. A method for estimating an existing area of an information code, comprising the steps of:
    inputting a two-dimensional image of an information code;
    storing image data of a predetermined image region on an image data memory, said image data including the two-dimensional image of said information code; and
    estimating an existing area of said information code in said image region of said image data memory based on said stored image data,
    said method further comprising the steps of:
        dissecting said image region into a plurality of search sections;
        counting brightness change points in each of said search sections based on image data of each search section;

detecting a candidate region having a likelihood of involving said information code based on the count value of the brightness chance points; and identifying said candidate region as said existing area of said information code; wherein said search sections are arranged in a hierarchical structure so that one upper-grade search section is dissected into a plurality of lower-grade search sections, and said method further comprising the steps of:

comparing a count value of brightness change points in each upper-grade search section with a predetermined upper-grade threshold;

detecting a candidate region consisting of consecutive upper-grade search sections having a count value of brightness change points equal to or larger than said upper-grade threshold;

comparing a count value of brightness change points in each lower-grade search section with a predetermined lower-grade threshold, when said lower-grade search section belongs to an upper-grade search section positioned in the vicinity of said candidate region;

adding said lower-grade search section to said candidate region when said lower-grade search section has a count value of brightness change points equal to or larger than said lower-grade threshold; and identifying said candidate region including said added lower-grade search section as said existing area of said information code.

14. A method for reading an information code, comprising the steps of:

inputting a two-dimensional image of an information code;

storing image data of a predetermined image region on an image data memory, said image data including the two-dimensional image of said information code;

dissecting said image region into a plurality of search sections;

counting brightness change points in each of said search sections based on image data of each search section;

detecting a candidate region having a likelihood of involving said information code based on the count value of the brightness change points;

identifying said candidate region as an existing area of said information code in said image region of said image data memory;

setting search lines only in a limited region corresponding to said candidate region;

detecting said existing area of said information code by searching the image data along said plurality of search lines;

reading the contents of said information code involved in the detected existing area based on the image data of said detected existing area;

obtaining an average of brightness-related values of said image data involved in said search section, and using said average of brightness-related values as one of judging conditions for detecting and identifying said candidate region.

15. A storing medium for storing a program installable in a computer system for detecting an existing area of an information code on an image data memory, said program determining the steps of:

inputting a two-dimensional image of an information code;

storing image data of a predetermined image region on an image data memory, said image data including the two-dimensional image of said information code; and estimating an existing area of said information code in said image region of said image data memory based on said stored image data, said method further comprising the steps of:

dissecting said image region into a plurality of search sections;

counting brightness change points in each of said search sections based on image data of each search section;

detecting a candidate region having a likelihood of involving said information code based on the count value of the brightness change points;

identifying said candidate region as said existing area of said information code;

obtaining an average of brightness-related values of said image data involved in said search section, and using said average of brightness-related values as one of judging conditions for detecting and identifying said candidate region.

16. A storing medium for storing a program installable in a computer system for reading an information code on an image data memory, said program determining the steps of:

inputting a two-dimensional image of an information code;

storing image data of a predetermined image region on an image data memory, said image data including the two-dimensional image of said information code;

dissecting said image region into a plurality of search sections;

counting brightness change points in each of said search sections based on image data of each search section;

detecting a candidate region having a likelihood of involving said information code based on the count value of the brightness change points;

identifying said candidate region as an existing area of said information code in said image region of said image data memory;

setting search lines only in a limited region corresponding to said candidate region;

detecting said existing area of said information code by searching the image data along said plurality of search lines;

reading the contents of said information code involved in the detected existing area based on the image data of said detected existing area;

obtaining an average of brightness-related values of said image data involved in said search section, and using said average of brightness-related values as one of judging conditions for detecting and identifying said candidate region.

* * * * *

UNITED STATES PATENT AND TRADEMARK OFFICE
CERTIFICATE OF CORRECTION

PATENT NO. : 6,678,412 B1
DATED : January 13, 2004
INVENTOR(S) : Hisashi Shigekusa et al.

It is certified that error appears in the above-identified patent and that said Letters Patent is hereby corrected as shown below:

Column 2,
Line 45, after "based" insert -- on --

Column 20,
Line 7, after "based" insert -- on --

Column 21,
Line 3, "chance" should be -- change --

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,678,412 B1  
APPLICATION NO. : 09/543881  
DATED : January 13, 2004  
INVENTOR(S) : Hisashi Shigekusa et al.

It is certified that error appears in the above-identified patent and that said Letters Patent is hereby corrected as shown below:

Title page, item [54] and col. 1, lines 1-6
Title should be:
METHOD FOR DETECTING A TWO-DIMENSIONAL CODE EXISTING AREA, METHOD FOR READING TWO-DIMENSIONAL CODE, AND A RECORDING MEDIUM STORING RELATED PROGRAMS Signed and Sealed this
Twelfth Day of April, 2011

David J. Kappos
*Director of the United States Patent and Trademark Office*